US012483858B2

(12) United States Patent
Lopatin et al.

(10) Patent No.: US 12,483,858 B2
(45) Date of Patent: Nov. 25, 2025

(54) SYSTEM AND METHOD FOR LOCATING WIRELESS ACCESSORIES

(71) Applicant: Apple Inc., Cupertino, CA (US)

(72) Inventors: Scott Lopatin, San Francisco, CA (US); Emmanuel Lalande, San Francisco, CA (US); Lawrence T. Lu, San Francisco, CA (US); Robert W. Mayor, Half Moon Bay, CA (US); Siva Ganesh Movva, Cupertino, CA (US); Raghunandan K. Pai, Saratoga, CA (US); Munish K. Poonia, San Jose, CA (US); Tommy Rochette, San Jose, CA (US); Sam Schaevitz, Los Gatos, CA (US); Yannick L. Sierra, San Francisco, CA (US); Navin Bindiganavile Suparna, Santa Clara, CA (US); Langford Wasada, San Francisco, CA (US)

(73) Assignee: Apple Inc., Cupertino, CA (US)

( * ) Notice: Subject to any disclaimer, the term of this patent is extended or adjusted under 35 U.S.C. 154(b) by 0 days.

(21) Appl. No.: 17/819,873

(22) Filed: Aug. 15, 2022

(65) Prior Publication Data

US 2022/0394431 A1 Dec. 8, 2022

Related U.S. Application Data

(63) Continuation of application No. 16/543,227, filed on Aug. 16, 2019, now Pat. No. 11,641,563.

(Continued)

(51) Int. Cl.
*H04W 4/029* (2018.01)
*H04W 4/80* (2018.01)
(Continued)

(52) U.S. Cl.
CPC ............ *H04W 4/029* (2018.02); *H04W 4/80* (2018.02); *H04W 12/126* (2021.01); *H04W 12/50* (2021.01); *H04W 12/63* (2021.01)

(58) Field of Classification Search
CPC ..... H04W 4/029; H04W 4/80; H04W 12/126; H04W 12/50; H04W 12/63; H04W 12/33;
(Continued)

(56) References Cited

U.S. PATENT DOCUMENTS 4,918,425 A 4/1990 Greenberg et al.
5,910,776 A 6/1999 Black
(Continued)

FOREIGN PATENT DOCUMENTS

CN 101682508 3/2010
CN 102325324 A 1/2012
(Continued)

OTHER PUBLICATIONS

PCT/US2019/048899, "Notification of Transmittal of the International Search Report and the Written Opinion of the International Searching Authority, or The Declaration" mailed Dec. 2, 2019, 5 pgs.

(Continued)

*Primary Examiner* — Md K Talukder
(74) *Attorney, Agent, or Firm* — Kilpatrick Townsend & Stockton LLP

(57) ABSTRACT

Embodiments described herein provide for system and methods to crowdsource the location of wireless devices and accessories that lack a connection to a wide area network. One embodiment provides for a data processing system configured to perform operations comprising loading a user interface on an electronic device, the user interface to enable the determination of a location of a wireless accessory that is associated with the electronic device, generating a set of (Continued)

public keys included within a signal broadcast by the wireless accessory, the signal broadcast during a first period, sending the set of public keys to a server with a request to return data that corresponds with a public key in the set of public keys, decrypting the location data using a private key associated with the public key, and processing the location data to determine a probable location for the wireless accessory.

23 Claims, 18 Drawing Sheets

Related U.S. Application Data

(60) Provisional application No. 62/738,983, filed on Sep. 28, 2018.

(51) Int. Cl.
*H04W 12/126* (2021.01)
*H04W 12/50* (2021.01)
*H04W 12/63* (2021.01)

(58) Field of Classification Search
CPC ... H04W 12/03; H04W 12/104; H04W 4/027; H04W 4/02; H04W 4/185; H04W 8/005; H04W 64/006; H04W 76/27; H04W 4/06; H04W 76/14; H04W 12/04; G01S 5/0295; G01S 5/14; G01S 5/0036; G01S 5/0045; G01S 5/0284; G01S 5/02; H04L 63/0442
See application file for complete search history.

(56) References Cited

U.S. PATENT DOCUMENTS

| | | |
|---|---|---|
| 6,292,660 B1 | 9/2001 | Hartless et al. |
| 6,345,098 B1 | 2/2002 | Matyas, Jr. et al. |
| 6,369,706 B1 | 4/2002 | Anderson et al. |
| 6,754,349 B1 | 6/2004 | Arthan |
| 6,993,350 B2 | 1/2006 | Katoh |
| 7,039,427 B2 | 5/2006 | Tachikawa |
| 7,059,182 B1 | 6/2006 | Ragner |
| 7,224,987 B1 | 5/2007 | Bhela et al. |
| 7,274,761 B2 | 9/2007 | Muller et al. |
| 7,342,497 B2 | 3/2008 | Chung et al. |
| 7,376,393 B2 | 5/2008 | Ono et al. |
| 7,388,491 B2 | 6/2008 | Chand et al. |
| 7,519,377 B2 | 4/2009 | Tsukamoto |
| 7,558,529 B2 | 7/2009 | Seshadri et al. |
| 7,657,248 B2 | 2/2010 | Hodoshima |
| 8,213,389 B2 | 7/2012 | Bush et al. |
| 8,224,355 B2 | 7/2012 | Beydler et al. |
| 8,351,937 B2 * | 1/2013 | Lee ............... H04W 8/005 455/434 |
| 8,457,617 B2 | 6/2013 | Sweeney et al. |
| 8,499,337 B1 | 7/2013 | Kenny |
| 8,538,401 B2 | 9/2013 | Kim et al. |
| 8,583,915 B1 * | 11/2013 | Huang ............. H04L 9/3234 726/6 |
| 8,873,758 B2 | 10/2014 | Bradley |
| 8,971,924 B2 | 3/2015 | Pai et al. |
| 9,009,794 B2 | 4/2015 | Dykeman et al. |
| 9,077,521 B2 | 7/2015 | Machani |
| 9,104,896 B2 | 8/2015 | Pai et al. |
| 9,277,353 B2 | 3/2016 | Merriam |
| 9,277,386 B1 | 3/2016 | Masiero et al. |
| 9,316,717 B2 | 4/2016 | Gicklhorn et al. |
| 9,323,916 B1 | 4/2016 | Wu et al. |
| 9,357,348 B2 | 5/2016 | Evans et al. |
| 9,420,423 B1 | 8/2016 | Mendelson |
| 9,426,749 B2 | 8/2016 | Cordeiro et al. |
| 9,432,802 B2 | 8/2016 | Matsushita et al. |
| 9,439,056 B2 | 9/2016 | Chukka et al. |
| 9,443,366 B2 | 9/2016 | Rayner |
| 9,456,298 B2 | 9/2016 | Lee et al. |
| 9,462,109 B1 | 10/2016 | Frazier Fields et al. |
| 9,516,620 B1 | 12/2016 | Upp et al. |
| 9,520,045 B2 | 12/2016 | Hawkins |
| 9,544,075 B2 | 1/2017 | Altman et al. |
| 9,557,185 B2 | 1/2017 | Kimes |
| 9,565,255 B2 | 2/2017 | Kapoor et al. |
| 9,641,622 B2 | 5/2017 | Kapoor et al. |
| 9,706,032 B2 | 7/2017 | Pai et al. |
| 9,762,316 B2 | 9/2017 | Kukuiski et al. |
| 9,769,601 B2 | 9/2017 | Zelinka |
| 9,779,596 B2 | 10/2017 | Ingrassia et al. |
| 9,781,106 B1 | 10/2017 | Vitus et al. |
| 9,801,059 B2 | 10/2017 | Ziv et al. |
| 9,820,093 B2 | 11/2017 | Mayor et al. |
| 9,848,075 B1 | 12/2017 | Ahmad et al. |
| 9,860,932 B2 | 1/2018 | Kapoor et al. |
| 9,922,531 B1 | 3/2018 | Doxey et al. |
| 9,961,507 B1 | 5/2018 | Mendelson |
| 10,015,836 B2 | 7/2018 | Kapoor et al. |
| 10,022,066 B2 | 7/2018 | Tomiha |
| 10,022,086 B1 | 7/2018 | Kahn et al. |
| 10,042,595 B2 | 8/2018 | Behzadi et al. |
| 10,110,642 B2 | 10/2018 | Numakami |
| 10,366,692 B1 | 7/2019 | Adams et al. |
| 10,368,378 B2 | 7/2019 | Foster et al. |
| 10,410,485 B2 | 9/2019 | Ingrassia et al. |
| 10,448,211 B1 | 10/2019 | Shen et al. |
| 10,506,517 B2 | 12/2019 | Dai Javad et al. |
| 10,600,310 B2 | 3/2020 | Hawkins |
| 10,667,313 B2 | 5/2020 | Maguire et al. |
| 10,701,203 B2 | 6/2020 | Fiorini et al. |
| 10,771,898 B2 | 9/2020 | Dusan et al. |
| 10,841,736 B1 | 11/2020 | De La Broise |
| 10,855,483 B1 | 12/2020 | Ramesh et al. |
| 10,862,684 B2 | 12/2020 | Hong et al. |
| 10,956,975 B1 | 3/2021 | Abdul Gaffar et al. |
| 10,970,989 B1 | 4/2021 | Quibelan et al. |
| 10,992,755 B1 | 4/2021 | Tran |
| 11,051,105 B2 | 6/2021 | Dusan et al. |
| 11,088,830 B2 | 8/2021 | Gu et al. |
| 11,107,088 B2 | 8/2021 | Radocchia et al. |
| 11,202,168 B2 | 12/2021 | Evans et al. |
| 11,265,716 B2 | 3/2022 | Klinkner et al. |
| 11,282,351 B2 | 3/2022 | Ingrassia, Jr. et al. |
| 11,288,562 B2 | 3/2022 | Purba |
| 11,310,652 B2 | 4/2022 | Norp et al. |
| 11,356,799 B2 | 6/2022 | Haney |
| 11,595,784 B2 | 2/2023 | Mohalik |
| 11,606,669 B2 | 3/2023 | Lopatin et al. |
| 11,622,237 B2 | 4/2023 | Diem |
| 11,641,563 B2 | 5/2023 | Lopatin et al. |
| 11,716,603 B2 * | 8/2023 | Lee ............... H04W 4/80 455/39 |
| 11,863,671 B1 | 1/2024 | Sierra et al. |
| 11,889,302 B2 | 1/2024 | Victa et al. |
| 12,075,313 B2 | 8/2024 | Lopatin et al. |
| 2002/0144215 A1 | 10/2002 | Hoskote et al. |
| 2003/0065918 A1 | 4/2003 | Willey |
| 2003/0092437 A1 | 5/2003 | Nowlin et al. |
| 2003/0182584 A1 | 9/2003 | Banes et al. |
| 2004/0162027 A1 * | 8/2004 | Chang ............ H04M 1/72412 455/41.2 |
| 2004/0249817 A1 | 12/2004 | Liu et al. |
| 2005/0021767 A1 | 1/2005 | Cai |
| 2005/0154896 A1 | 7/2005 | Widman et al. |
| 2005/0190098 A1 | 9/2005 | Bridgelall et al. |
| 2005/0285739 A1 | 12/2005 | Velhal et al. |
| 2006/0039337 A1 | 2/2006 | Hodoshima |
| 2006/0111835 A1 | 5/2006 | Baker et al. |
| 2007/0139199 A1 | 6/2007 | Hanlon |
| 2007/0249374 A1 | 10/2007 | Hu et al. |
| 2007/0283151 A1 | 12/2007 | Nakano et al. |
| 2007/0283395 A1 | 12/2007 | Wezowski |
| 2008/0004798 A1 | 1/2008 | Troxler et al. |
| 2008/0119953 A1 | 5/2008 | Reed et al. |
| 2008/0120196 A1 | 5/2008 | Reed et al. |

(56) References Cited

U.S. PATENT DOCUMENTS

| | | | |
|---|---|---|---|
| 2009/0058670 A1 | 3/2009 | Sweeney et al. | |
| 2009/0150674 A1 | 6/2009 | Richardson et al. | |
| 2009/0315767 A1 | 12/2009 | Scalisi et al. | |
| 2009/0323972 A1 | 12/2009 | Kohno et al. | |
| 2009/0325599 A1 | 12/2009 | Vuori | |
| 2010/0079249 A1 | 4/2010 | Pan | |
| 2010/0159833 A1 | 6/2010 | Lewis et al. | |
| 2010/0184378 A1 | 7/2010 | Wakefield | |
| 2010/0245054 A1 | 9/2010 | Kim | |
| 2010/0289620 A1 | 11/2010 | Aminger et al. | |
| 2011/0124326 A1 | 5/2011 | Kudo | |
| 2012/0054493 A1 | 3/2012 | Bradley | |
| 2012/0083209 A1 | 4/2012 | Giles et al. | |
| 2012/0100868 A1* | 4/2012 | Kim | H04W 4/023 455/456.1 |
| 2012/0275361 A1 | 11/2012 | Berenberg et al. | |
| 2012/0310391 A1 | 12/2012 | Sanders | |
| 2012/0328061 A1 | 12/2012 | Chow | |
| 2013/0023238 A1 | 1/2013 | Kaplan et al. | |
| 2013/0104035 A1 | 4/2013 | Wagner et al. | |
| 2013/0111555 A1 | 5/2013 | Leneel | |
| 2013/0171986 A1 | 7/2013 | Shimizu | |
| 2013/0271902 A1 | 10/2013 | Lai et al. | |
| 2013/0275873 A1 | 10/2013 | Shaw et al. | |
| 2013/0290191 A1 | 10/2013 | Dischamp et al. | |
| 2013/0290522 A1* | 10/2013 | Behm, Jr. | H04W 4/021 709/224 |
| 2013/0343542 A1 | 12/2013 | Rosati et al. | |
| 2014/0111307 A1 | 4/2014 | Ingrassia et al. | |
| 2014/0222685 A1* | 8/2014 | Middleton | H04W 4/023 705/50 |
| 2014/0379584 A1 | 12/2014 | Ward | |
| 2015/0019124 A1 | 1/2015 | Bandyopadhyay et al. | |
| 2015/0072618 A1* | 3/2015 | Granbery | G06Q 30/00 455/41.2 |
| 2015/0189596 A1 | 7/2015 | Stephens | |
| 2015/0215781 A1 | 7/2015 | Reed et al. | |
| 2015/0277852 A1 | 10/2015 | Burgis | |
| 2015/0289207 A1 | 10/2015 | Kubo et al. | |
| 2015/0334569 A1 | 11/2015 | Rangarajan et al. | |
| 2015/0350140 A1 | 12/2015 | Garcia et al. | |
| 2015/0350820 A1* | 12/2015 | Son | H04W 12/03 455/41.2 |
| 2015/0356030 A1 | 12/2015 | Zahand et al. | |
| 2015/0382140 A1 | 12/2015 | Cho et al. | |
| 2016/0006577 A1 | 1/2016 | Logan | |
| 2016/0017402 A1 | 1/2016 | Roth et al. | |
| 2016/0037439 A1 | 2/2016 | Shamis et al. | |
| 2016/0057572 A1 | 2/2016 | Bojorquez Alfaro et al. | |
| 2016/0057625 A1 | 2/2016 | Andrada et al. | |
| 2016/0069991 A1 | 3/2016 | Das et al. | |
| 2016/0080591 A1 | 3/2016 | Asakura | |
| 2016/0087959 A1* | 3/2016 | Park | H04W 12/04 713/168 |
| 2016/0088143 A1 | 3/2016 | Cohn et al. | |
| 2016/0094947 A1 | 3/2016 | Shen et al. | |
| 2016/0140335 A1 | 5/2016 | Proulx et al. | |
| 2016/0164973 A1 | 6/2016 | Kapoor et al. | |
| 2016/0174023 A1 | 6/2016 | Cavallaro et al. | |
| 2016/0180392 A1 | 6/2016 | Liu et al. | |
| 2016/0189507 A1 | 6/2016 | Rayner | |
| 2016/0205556 A1 | 7/2016 | Borghei | |
| 2016/0212538 A1 | 7/2016 | Fullam et al. | |
| 2016/0234213 A1 | 8/2016 | Kim et al. | |
| 2016/0242192 A1 | 8/2016 | Llosa et al. | |
| 2016/0248564 A1 | 8/2016 | Qi et al. | |
| 2016/0302137 A1* | 10/2016 | Escott | H04W 48/16 |
| 2016/0330095 A1 | 11/2016 | Numakami | |
| 2016/0344712 A1 | 11/2016 | Ding et al. | |
| 2016/0352518 A1 | 12/2016 | Ford et al. | |
| 2016/0357385 A1 | 12/2016 | Dan et al. | |
| 2016/0360350 A1 | 12/2016 | Watson et al. | |
| 2016/0371507 A1 | 12/2016 | Jakobsson | |
| 2017/0006417 A1 | 1/2017 | Canoy et al. | |
| 2017/0078408 A1 | 3/2017 | Lepp et al. | |
| 2017/0126818 A1 | 5/2017 | Kang | |
| 2017/0127340 A1 | 5/2017 | Dooey et al. | |
| 2017/0134898 A1* | 5/2017 | Vega | H04W 12/50 |
| 2017/0171181 A1* | 6/2017 | Britt | H04W 12/03 |
| 2017/0228935 A1 | 8/2017 | Foster et al. | |
| 2017/0272415 A1 | 9/2017 | Zhao et al. | |
| 2017/0330031 A1 | 11/2017 | Wilson et al. | |
| 2018/0013815 A1 | 1/2018 | Gold | |
| 2018/0025595 A1 | 1/2018 | Ingrassia et al. | |
| 2018/0035374 A1 | 2/2018 | Borden et al. | |
| 2018/0176748 A1 | 6/2018 | Kim et al. | |
| 2018/0183591 A1 | 6/2018 | De Laat et al. | |
| 2018/0183596 A1* | 6/2018 | Deshpande | H04W 12/03 |
| 2018/0184286 A1 | 6/2018 | Patterson | |
| 2018/0199138 A1 | 7/2018 | Dusan et al. | |
| 2018/0219872 A1 | 8/2018 | Sugashima et al. | |
| 2018/0227284 A1 | 8/2018 | Sugano et al. | |
| 2018/0262907 A1* | 9/2018 | Alanis | H04W 12/64 |
| 2018/0288208 A1 | 10/2018 | Lee et al. | |
| 2018/0317266 A1 | 11/2018 | Britt et al. | |
| 2018/0343561 A1 | 11/2018 | Patterson | |
| 2018/0348718 A1 | 12/2018 | Richardson et al. | |
| 2019/0028281 A1 | 1/2019 | Turissini et al. | |
| 2019/0028445 A1 | 1/2019 | McLaughlin et al. | |
| 2019/0034920 A1* | 1/2019 | Nolan | H04L 9/50 |
| 2019/0037469 A1 | 1/2019 | Krishnan et al. | |
| 2019/0058966 A1 | 2/2019 | Puppala et al. | |
| 2019/0069243 A1 | 2/2019 | Bean et al. | |
| 2019/0106173 A1 | 4/2019 | Robison et al. | |
| 2019/0124469 A1 | 4/2019 | Roy et al. | |
| 2019/0191301 A1* | 6/2019 | Fang | H04L 9/30 |
| 2019/0213528 A1 | 7/2019 | Gupta et al. | |
| 2019/0246253 A1 | 8/2019 | Ryu et al. | |
| 2019/0289059 A1 | 9/2019 | Vanahalli et al. | |
| 2020/0034835 A1* | 1/2020 | Kim | G06F 21/00 |
| 2020/0074822 A1 | 3/2020 | Ingrassia, Jr. et al. | |
| 2020/0107164 A1* | 4/2020 | Lopatin | G01S 5/0284 |
| 2020/0145244 A1 | 5/2020 | Hollinger et al. | |
| 2020/0177595 A1 | 6/2020 | Rakshit et al. | |
| 2020/0187001 A1 | 6/2020 | Ard et al. | |
| 2020/0226908 A1 | 7/2020 | Doxey et al. | |
| 2020/0242662 A1 | 7/2020 | Middleton et al. | |
| 2020/0344549 A1 | 10/2020 | Wegener | |
| 2021/0044957 A1 | 2/2021 | Norp et al. | |
| 2021/0136846 A1 | 5/2021 | Ponnusamy et al. | |
| 2021/0203747 A1 | 7/2021 | Gorsica, IV et al. | |
| 2021/0204115 A1 | 7/2021 | Gorsica, IV et al. | |
| 2021/0250355 A1 | 8/2021 | Galdo et al. | |
| 2021/0256833 A1* | 8/2021 | Daoura | H04W 4/021 |
| 2021/0334851 A1* | 10/2021 | Proctor, Jr. | G06F 21/60 |
| 2021/0400045 A1 | 12/2021 | Kondeti | |
| 2022/0021684 A1 | 1/2022 | Mensah et al. | |
| 2022/0052847 A1 | 2/2022 | Gonzalez Cervantes et al. | |
| 2022/0070667 A1 | 3/2022 | Victa et al. | |
| 2022/0078029 A1 | 3/2022 | Galdo et al. | |
| 2022/0165139 A1 | 5/2022 | Ingrassia, Jr. et al. | |
| 2022/0200789 A1 | 6/2022 | Lalande et al. | |
| 2022/0224300 A1 | 7/2022 | Knode | |
| 2022/0256633 A1 | 8/2022 | Gu et al. | |
| 2022/0327196 A1 | 10/2022 | Trapani | |
| 2022/0369022 A1 | 11/2022 | Jorgovanovic et al. | |
| 2022/0386076 A1 | 12/2022 | Lopatin et al. | |
| 2022/0394431 A1* | 12/2022 | Lopatin | G01S 5/0295 |
| 2022/0394660 A1 | 12/2022 | Werner et al. | |

FOREIGN PATENT DOCUMENTS

| | | |
|---|---|---|
| CN | 104833945 | 8/2015 |
| CN | 104980918 A | 10/2015 |
| CN | 106412816 | 2/2017 |
| CN | 106792501 A | 5/2017 |
| CN | 107209983 A | 9/2017 |
| CN | 107328424 | 11/2017 |
| CN | 108073829 A | 5/2018 |
| CN | 108223229 A | 6/2018 |
| CN | 108476404 A | 8/2018 |
| CN | 108520552 | 9/2018 |
| CN | 109596118 | 4/2019 |

(56) References Cited

FOREIGN PATENT DOCUMENTS

| | | |
|---|---|---|
| CN | 111436040 | 7/2020 |
| CN | 112068512 | 12/2020 |
| CN | 114071357 | 2/2022 |
| EP | 1296155 | 3/2003 |
| EP | 2020784 | 2/2009 |
| GB | 2472192 A | 2/2011 |
| JP | H11262065 | 9/1999 |
| JP | 2007150904 | 6/2007 |
| JP | 2018191522 | 12/2018 |
| JP | 2021025798 | 2/2021 |
| KR | 20140044916 | 4/2014 |
| KR | 20140044916 A | 4/2014 |
| KR | 101597077 B1 | 2/2016 |
| KR | 20170013833 | 2/2017 |
| KR | 20170013833 A | 2/2017 |
| KR | 20180086118 | 7/2018 |
| KR | 2019-0141998 A | 12/2019 |
| KR | 20210033514 A | 3/2021 |
| KR | 20220079702 A | 6/2022 |
| KR | 20230098353 A | 7/2023 |
| KR | 20240004874 A | 1/2024 |
| KR | 20240154681 A | 10/2024 |
| WO | 2010126846 | 11/2010 |
| WO | 2012030733 | 3/2012 |
| WO | 2013036488 | 3/2013 |
| WO | 2013163334 | 10/2013 |
| WO | 2014005004 | 3/2014 |
| WO | 2014042507 A1 | 3/2014 |
| WO | 2016032610 | 3/2016 |
| WO | 2016036453 A1 | 3/2016 |
| WO | 2017107077 | 6/2017 |
| WO | 2018001518 A1 | 1/2018 |
| WO | 2018118026 A1 | 6/2018 |
| WO | 2018135919 | 7/2018 |
| WO | 2018156555 | 8/2018 |
| WO | 2018160863 A1 | 9/2018 |
| WO | 2019232420 A2 | 12/2019 |
| WO | 2020214701 A1 | 10/2020 |
| WO | 2020214708 A1 | 10/2020 |
| WO | 2020214709 A1 | 10/2020 |
| WO | 2020214711 A1 | 10/2020 |
| WO | 2022046527 | 3/2022 |
| WO | 2022256438 | 12/2022 |

OTHER PUBLICATIONS

A. Korolova et al., "Cross-App Tracking Via Nearby Bluetooth Low Energy Devices", A presentation proposal for PrivacyCon 2017, Published Mar. 13, 2018, 12 pgs.
PCT/US2020/028318, "PCT Notification of Transmittal of the International Search Report and the Written Opinion of the International Searching Authority, or the Declaration", Mailed Jul. 8, 2020, 16 pages.
PCT/US2020/028326, "PCT Notification of Transmittal of the International Search Report and the Written Opinion of the International Searching Authority, or the Declaration", Mailed Jul. 3, 2020, 12 pages.
PCT/US2020/028327, "PCT Notification of Transmittal of the International Search Report and the Written Opinion of the International Searching Authority, or the Declaration", Mailed Sep. 14, 2020, 17 pages.
PCT/US2020/028329, "PCT Notification of Transmittal of the International Search Report and the Written Opinion of the International Searching Authority, or the Declaration", Mailed Jul. 15, 2020, 13 pages.
Mannan, Mohammad, et al. "Mercury: Recovering forgotten passwords using personal devices." International Conference on Financial Cryptography and Data Security. Springer, Berlin, Heidelberg, 2011 (Year: 2011).
FOFA, "Find One, Find All Key Finder & Remote Control Locators", received from The Wayback Machine—https://web.archive.org/web/20200715080402/http://www.findonefindall.com:80/index.htm, 3 pages.
Kim et al., "In/Out Status Monitoring in Mobile Asset Tracking with Wireless Sensor Networks", received from www.mdpi.com/journal/sensors, published Mar. 26, 2019, 22 pages.
Fuemmeler et al., "Energy Efficient Multi-Object Tracking in Sensor Networks", received from https://ieeexplore.ieee.org/document/5439914, published Mar. 29, 2010, 9 pages.
Cocchi et al., "Subband Neural Networks Prediction for On-Line Audio Signal Recovery", received from https://ieeexplore.ieee.org/document/1021887, Published Jul. 2002, 10 pages.
PCT/US2022/027681, "PCT Notification of transmittal of the International Search Report and the Written Opinion of the International Searching Authority, or the Declaration", mailed Jul. 28, 2022, 9 pages.
EP22172663.1, "Extended European Search Report" mailed Jan. 25, 2023, 18 pages.
Lopez, Mareo, "The Importance of a Speaker's Resonant Frequency", proaudioland.com, 3 pages, Aug. 2015 (Year: 2015).
Thetileapp.com [online], "Learn How Tile's Tracking Device Helps You Find Your Lost Things," Dec. 9, 2016, retrieved from URL <https://www.thetileapp.com/how-it-works>, 9 pages.
PCT/US2023/017975, "PCT Notification of Transmittal of the International Search Report and the Written Opinion of the International Searching Authority, or the Declaration", mailed Jun. 29, 2023, 12 pages.
Chinese Patent Application No. CN202210801576.2 , Office Action, Mailed On Feb. 25, 2025, 14 pages (7 pages of English translation and 7 pages of official language).
Korean Patent Application No. KR10-20-237020350 , Notice of Decision to Grant, Mailed On Feb. 6, 2025, 6 pages (3 pages of English translation and 3 pages of official language).
Chinese Patent Application No. CN202210801540.4 , Office Action, Mailed On Nov. 28, 2024, 14 pages (9 pages of English translation and 5 pages of official language).
Chinese Patent Application No. CN202210801616.3 , Office Action, Mailed On Dec. 31, 2024, 18 pages (10 pages of English translation and 8 pages of official language).
Chinese Patent Application No. CN202210801617.8 , Office Action, Mailed On Dec. 19, 2024, 15 pages (8 pages of English translation and 7 pages of official language).
Chinese Patent Application No. CN202210801842.1 , Office Action, Mailed On Nov. 21, 2024, 15 pages (9 pages of English translation and 6 pages of official language).
U.S. Appl. No. 17/813,897, "Corrected Notice of Allowability", Feb. 15, 2023, 2 pages.
U.S. Appl. No. 17/813,897, Notice of Allowance, Mailed On Jan. 11, 2023, 8 pages.
U.S. Appl. No. 17/818,859, Non Final Office Action, Mailed On Oct. 4, 2023, 10 pages.
U.S. Appl. No. 17/818,859, Notice of Allowance, Mailed On Apr. 23, 2024, 8 pages.
Chinese Patent Application No. CN202210801540.4, Office Action, Mailed On Jul. 31, 2023, 12 pages (7 pages of English translation and 5 pages of official language).
Chinese Patent Application No. CN202210801540.4, Office Action, Mailed On Jan. 31, 2024, 13 pages (8 pages of English translation and 5 pages of official language).
Chinese Patent Application No. CN202210801540.4, Office Action, Mailed On Jun. 27, 2024, 17 pages (10 pages of English translation and 7 pages of official language).
European Patent Application No. EP19770220.2, "Intention to Grant", Feb. 23, 2022, 5 pages.
European Patent Application No. EP22174704.1, "Intention to Grant", Aug. 28, 2024, 5 pages.
European Patent Application No. EP22178242.8, Extended European Search Report, Mailed On Sep. 23, 2022, 13 pages.
European Patent Application No. EP24221842.8, Extended European Search Report, Mailed On Apr. 14, 2025, 11 pages.
European Patent Application No. EP24221843.6, Extended European Search Report, Mailed On Apr. 28, 2025, 12 pages.
Indian Patent Application No. IN202218036178, "First Examination Report", Jun. 3, 2025, 7 pages.

(56) References Cited

OTHER PUBLICATIONS

Chinese Patent Application No. CN202210801842.1, Office Action, Mailed On Jun. 27, 2025, 12 pages (8 pages of English translation and 4 pages of official language).
European Patent Application No. EP22178242.8, "Intention to Grant", Jul. 2, 2025, 9 pages.

* cited by examiner

SYSTEM AND METHOD FOR LOCATING WIRELESS ACCESSORIES

CROSS-REFERENCE

This application is a continuation of co-pending U.S. patent application Ser. No. 16/543,227, filed Aug. 16, 2019, which claims the benefit of priority of U.S. Provisional Application No. 62/738,983, filed on Sep. 28, 2018, both of which are hereby incorporated by reference in their entirety.

FIELD

Embodiments described herein relate generally to a system and method of locating wireless devices and accessories. More specifically, embodiments relate to crowdsourcing the location of wireless devices and accessories that are not connected to a wide area network.

BACKGROUND OF THE DESCRIPTION

Current security features in handheld and portable products allow the location of the product to be identified when requested by the user, such as in instances where the product is lost or stolen. If the wireless device includes positioning technology, the device can be configured to report its last location to the server computer, which is displayed by the service on a map presented to the user. Often wireless devices are used with wireless accessory devices that cannot determine their location and cannot communicate with a remote tracking services over a wide area network. These accessory devices can include, for example, wireless earbuds, headphones, headsets and other wearable devices (e.g., smartwatches, fitness bands, optical head-mounted displays) that communicate directly with the wireless device using peer-to-peer communications. For wireless accessory devices that cannot determine their location and cannot communicate with the remote tracking service, those devices cannot be tracked by the service when lost or stolen.

SUMMARY OF THE DESCRIPTION

Embodiments described herein provide for system and methods to crowdsource the location of wireless devices and accessories that lack a connection to a wide area network. One embodiment provides for a data processing system configured to perform operations comprising loading a user interface on an electronic device, the user interface to enable the determination of a location of a wireless accessory that is associated with the electronic device, generating a set of public keys included within a signal broadcast by the wireless accessory, the signal broadcast during a first period, sending the set of public keys to a server with a request to return data that corresponds with a public key in the set of public keys, decrypting the location data using a private key associated with the public key, and processing the location data to determine a probable location for the wireless accessory.

One embodiment provides for a data processing system comprising a memory to store instructions for execution and one or more processors to execute the instructions stored in memory. The instructions, when executed, cause the one or more processors to load a user interface on an electronic device that includes the data processing system, the user interface to enable the determination of a location of a wireless accessory that is associated with the electronic device, generate a set of public keys included within a signal broadcast by the wireless accessory, the signal broadcast during a first period, send the set of public keys to a server with a request to return data that corresponds with a public key in the set of public keys, decrypt the location data using a private key associated with the public key in response to receipt of location data from the server, and process the location data to determine a probable location for the wireless accessory.

One embodiment provides for a method implemented on an electronic device, the method comprising performing a beacon scan using a baseband processor of the electronic device. The beacon scan can be performed while an application processor of the electronic device is in a low power state. The method additionally comprises receiving beacon data via a wireless radio coupled to the baseband processor, the beacon data to identify a wireless accessory. The beacon identifier can be a public key generated by the wireless accessory. The method additionally comprises storing a timestamp and beacon identifier to a beacon scan buffer, determining a location for the electronic device that corresponds with the timestamp when an application processor of the electronic device is in an active state, encrypting the location for the electronic device using the beacon identifier for the wireless accessory, and transmitting encrypted location data, the beacon identifier, and the timestamp to a server device, the server to store the encrypted location data for retrieval by an electronic device associated with the wireless accessory.

The above summary does not include an exhaustive list of all embodiments in this disclosure. All systems and methods can be practiced from all suitable combinations of the various aspects and embodiments summarized above, and also those disclosed in the Detailed Description below.

BRIEF DESCRIPTION OF THE DRAWINGS

The present invention is illustrated by way of example and not limitation in the figures of the accompanying drawings in which like references indicate similar elements, and in which.

DETAILED DESCRIPTION

Figure 1:
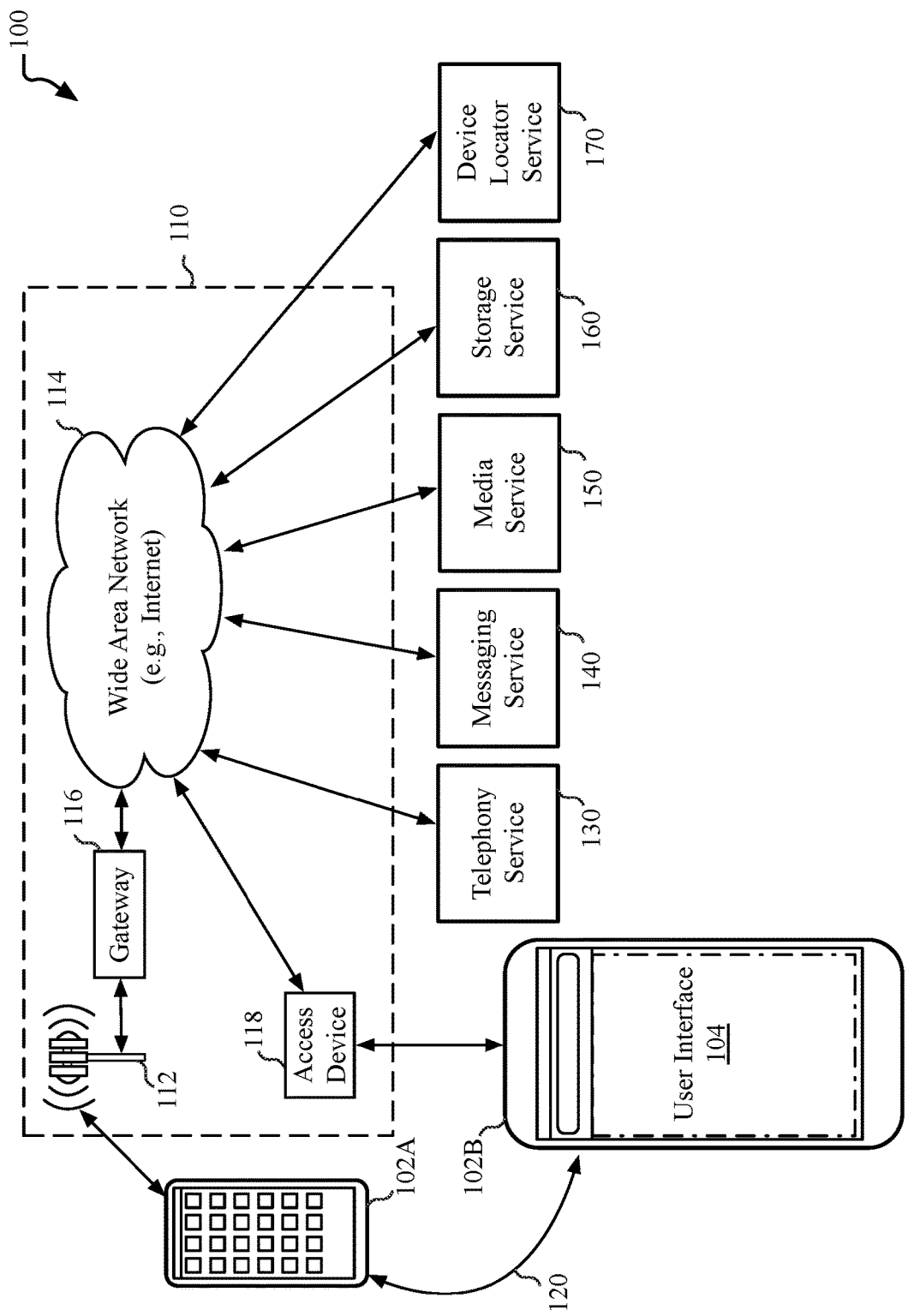
FIG. 1 is a block diagram of a network operating environment for mobile devices, according to an embodiment.

Embodiments described herein provide techniques to enable secure crowdsourced locator services for lost or misplaced devices that cannot communicate with a wide area network. Various embodiments and aspects will be described with reference to details discussed below, and the accompanying drawings will illustrate the various embodiments. The following description and drawings are illustrative and are not to be construed as limiting. Numerous specific details are described to provide a thorough understanding of various embodiments. However, in certain instances, well-known or conventional details are not described in order to provide a concise discussion of embodiments.

The terminology used in this description is for the purpose of describing particular embodiments only and is not intended to be limiting of the invention. As used in the description of the invention and the appended claims, the singular forms "a", "an" and "the" are intended to include the plural forms as well, unless the context clearly indicates otherwise. It will also be understood that the term "and/or" as used herein refers to and encompasses any and all possible combinations of one or more of the associated listed items. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

A portion of this disclosure contains material that is subject to copyright protection. The copyright owner has no objection to the facsimile reproduction by anyone of the patent document or the patent disclosure, as it appears in the Patent and Trademark Office patent files or records, but otherwise reserves all copyright rights whatsoever. Copyright 2018 Apple Inc.

In the discussion that follows, a computing device that includes a touch-sensitive display is described. It should be understood, however, that the computing device may include one or more other physical user-interface devices. The various applications that may be executed on the device may use at least one common physical user-interface device, such as the touch-sensitive surface. One or more functions of the touch-sensitive surface as well as corresponding information displayed on the device may be adjusted and/or varied from one application to the next and/or within a respective application. In this way, a common physical architecture (such as the touch-sensitive surface) of the device may support the variety of applications with user interfaces that are intuitive and transparent.

Some processes are described below in terms of some sequential operations. However, it should be appreciated that some of the operations described may be performed in a different order. Moreover, some operations may be performed in parallel rather than sequentially.

FIG. 1 is a block diagram of a network operating environment 100 for mobile devices, according to an embodiment. The network operating environment 100 includes multiple mobile devices, such as mobile device 102A and mobile device 102B. The mobile devices 102A-102B can each be any electronic device capable of communicating with a wireless network and a wireless accessory device. Some example mobile devices include but are not limited to a smartphone, a tablet computer, a notebook computer, a wearable computer (e.g., smartwatch or other wearable computing accessory), a mobile media player, a personal digital assistant, and other similar devices. Each of mobile device 102A and mobile device 102B include a user interface, such as user interface 104 of mobile device 102B. Mobile device 102A and mobile device 102B can communicate over one or more wired and/or wireless networks 110 to perform data communication. For example, a wireless network 112 (e.g., cellular network, Wi-Fi network) can communicate with a wide area network 114, such as the Internet, by use of a gateway 116. Likewise, an access device 118, such as a mobile hotspot wireless access device, can provide communication access to the wide area network 114. The gateway 116 and access device 118 can then communicate with the wide area network 114 over a combination of wired and/or wireless networks.

In some implementations, both voice and data communications can be established over the wireless network 112 and/or the access device 118. For example, mobile device 102A can place and receive phone calls (e.g., using VoIP protocols), send and receive e-mail messages (e.g., using POP3 protocol), and retrieve electronic documents and/or streams, such as web pages, photographs, and videos, over the wireless network 112, gateway 116, and wide area network 114 (e.g., using TCP/IP or UDP protocols). In some implementations, mobile device 102A can place and receive phone calls, send and receive e-mail messages, and retrieve electronic documents over the access device 118 and the wide area network 114. In some implementations, mobile device 102A or mobile device 102B can be physically connected to the access device 118 using one or more cables, for example, where the access device 118 is a personal computer. In this configuration, mobile device 102A or mobile device 102B can be referred to as a "tethered" device. In one embodiment, mobile device 102A can communicate with mobile device 102B via a wireless peer-to-peer connection 120. The wireless peer-to-peer connection 120 can be used to synchronize data between the devices.

Mobile device 102A or mobile device 102B can communicate with one or more services, such as a telephony service 130, a messaging service 140, a media service 150, a storage service 160, and a device locator service 170 over the one or more wired and/or wireless networks 110. For example, the telephony service 130 can enable telephonic communication between mobile device 102A and mobile device 102B, or between a mobile device and a wired telephonic device. The telephony service 130 can route voice over IP (VoIP) calls over the wide area network 114 or can access a cellular voice network (e.g., wireless network 112). The messaging service 140 can, for example, provide e-mail and/or other messaging services. The media service 150 can, for example, provide access to media files, such as song files, audio books, movie files, video clips, and other media data. The storage service 160 can provide network storage capabilities to mobile device 102A and mobile device 102B to store documents and media files. The device locator service 170 can enable a user to locate a lost or misplaced device that was, at least at some point, connected to the one or more wired and/or wireless networks 110. Other services can also be provided, including a software update service to update operating system software or client software on the mobile devices. In one embodiment, the messaging service 140, media service 150, storage service 160, and device locator service 170 can each be associated with a cloud service provider, where the various services are facilitated via a cloud services account associated with the mobile devices 102A-102B.

Figure 2:
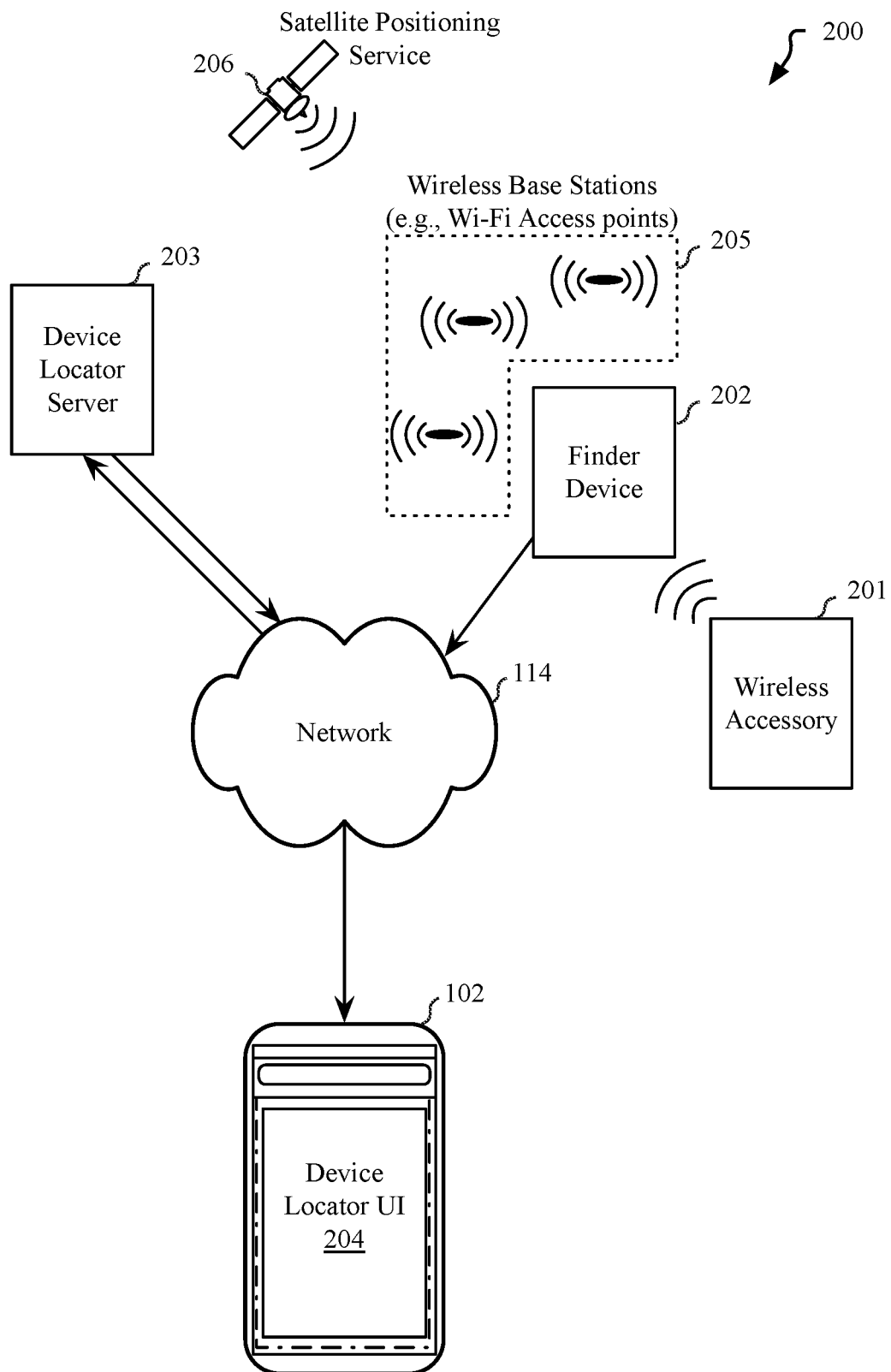
FIG. 2 illustrates a system to locate a wireless accessory that lacks access to a wide area network, according to an embodiment.

FIG. 2 illustrates a system 200 to locate a wireless accessory 201 that lacks access to a wide area network, according to an embodiment. In one embodiment, the wireless accessory 201 includes one or more wireless transceivers and can communicate, either directly or indirectly (e.g., through another device or computer) with a companion device (e.g., mobile device 102) over a wireless network or peer-to-peer communication link. Some examples of wireless accessory devices include but are not limited to wireless earbuds, headphones, headsets and other wearable devices (e.g., smartwatches, fitness bands, optical head-mounted displays). The wireless accessory 201 can also include other wireless devices such as game controllers or remote controls. The wireless accessory 201, in one embodiment, also includes smartphones, tablet computers, laptop computers, smart speaker devices, televisions, or television set top boxes that at least temporarily are unable to access a wide area network, such as the Internet (e.g., wide area network 114 as in FIG. 1). The wireless accessory can also be any other wireless device, including beacons or locator tags that can be attached to other devices to enable the tracking or locating of those devices. In one embodiment, the wireless accessory 201 can be paired with the mobile device 102 using a wireless technology standard, such as but not limited to Bluetooth. The wireless accessory 201 can also communicate with the mobile device 102 over wireless technologies such as Wi-Fi direct, Zigbee, or AirPlay. While the companion device to which the wireless accessory 201 is paired is generally referred to as a mobile device 102, companion devices are not limited to mobile devices. Companion devices, in some embodiments, can also include laptop or desktop devices and can additionally include some wearable accessories, such as but not limited to a smart watch device or a wearable display.

In one embodiment, the wireless accessory 201 can periodically transmit a wireless beacon signal. The wireless accessory 201 can transmit the beacon signal using one of a variety of wireless technologies described herein (e.g., Bluetooth, Wi-Fi, etc.) and in one embodiment can also beacon using an ultra-wide band (UWB) radio technology. The beacon signal can be transmitted using a single wireless technology, one of multiple selectable wireless technologies, or multiple simultaneous wireless technologies. The beacon signal can transmit a beacon identifier that includes information to specifically identify the wireless accessory 201. In one embodiment, the beacon identifier is a public encryption key associated with the device.

The beacon signal can also convey information about the wireless accessory 201, such as a beacon type, device classification, battery level. In one embodiment the beacon signal can also convey device status, such as a lost status, alarm status, or a near-owner status. The beacon signal can also include information that specifies battery life, charging status, and/or other status information. The lost status can indicate that the wireless accessory 201 has determined itself to be lost or has been placed into a lost state by the owner of the device. The alarm status can indicate that the wireless accessory 201 was placed in a state that the device should trigger an alarm if moved from a current location. The near-owner status can indicate that the wireless accessory 201 has detected the nearby presence of the mobile device 102 associated with the owner of the accessory.

The beacon signal can be detected by a finder device 202, which is locally proximate to the wireless accessory 201. The finder device 202 can be a similar device as the mobile device 102 and can receive and transmitting data over a wide area network 114 and receiving and transmitting using similar wireless technologies as the wireless accessory 201 (e.g., Bluetooth, etc.). Particularly, the finder device 202 can receive data using the wireless protocol over which the beacon signal is transmitted. The finder device 202 can determine a location using one or more location and/or positioning services including, but not limited to a satellite positioning service 206 or a terrestrial positioning system using RF signals received from wireless base stations 205 such as Wi-Fi access points or cell tower transmitters of a cellular telephone network. In an embodiment, the finder device 202 periodically stores its location as determined based on the one or more location and/or positioning services. The stored location can be associated with a timestamp for which the location was determined. When the finder device 202 receives a beacon signal from the wireless accessory 201, the finder device 202 can transmit a location for the finder device over the wide area network 114 to a device locator server 203. The timestamp for a determined location for the finder device 202 can be correlated with a timestamp for which a beacon signal was received to associate a geographic location with a received beacon signal.

Where the wireless accessory 201 provides a public key within the beacon signal, the finder device 202 can encrypt the determined location data and transmit the encrypted location data to the device locator server 203 over the wide area network 114. In one embodiment, additional data can either be encrypted and transmitted along with the location data or transmitted unencrypted to the device locator server 203. For example, a received signal strength indicator (RSSI) for the beacon signal can be transmitted along with the location data. The RSSI data can then be used to determine the distance of the wireless accessory 201 from the finder device 202 and assist in triangulation on the owner device. Where the RSSI data is transmitted in an unencrypted state, in one embodiment the server can use RSSI information to reduce noise by discarding very weak signals if other, stronger signals are present. In one embodiment, UWB ranging data can also be provided, where such data is available.

In one embodiment, the finder device 202 can behave differently upon receiving a beacon signal from a wireless accessory 201 depending upon a device status conveyed by the wireless accessory 201. For standard beacon signals, the finder device 202 can place encrypted location data into a queue and transmit the location data to the device locator server 203 during a periodic transmission window. However, if the wireless accessory 201 is indicating an alarm state, the finder device 202 can transmit the location data to the device locator server 203 immediately. Additionally, the finder device 202 may not transmit the location data to the device locator server 203 if the beacon signal of the wireless accessory 201 indicates that the accessory is near the owner of the accessory. Alternatively, the finder device 202 may delay transmission of encrypted location data.

If the owner of the wireless accessory 201 wishes to locate the wireless accessory, the owner can access a device locator user interface 204 on the mobile device 102. The device locator user interface 204 can be associated with a device locator application that is used to locate electronic devices and accessories that are registered with an online account of the user, such as a cloud services account or another type of online account. The device owner, using the device locator UI 204, can query the device locator server 203 for location data that may have been transmitted to the device locator server by a finder device 202 of the wireless accessory 201. In one embodiment, the mobile device 102 can transmit the public encryption key associated with the wireless accessory 201 to the device locator server 203. The device locator server 203 can then return any stored location data that corresponds with the public encryption key. The location data returned to the mobile device 102 can be encrypted data that is encrypted by the finder device 202 using the public encryption key. The mobile device 102 can use an associated private key to decrypt the encrypted location data. The decrypted location data can then be processed by the mobile device 102 to determine a most probable location for the wireless accessory 201. In various embodiments, the most probable location for the wireless accessory 201 can be determined by triangulation from multiple received locations and using other data, such as a beacon signal RSSI associated with each location and timestamp or UWB ranging data included within the location data.

Figure 3:
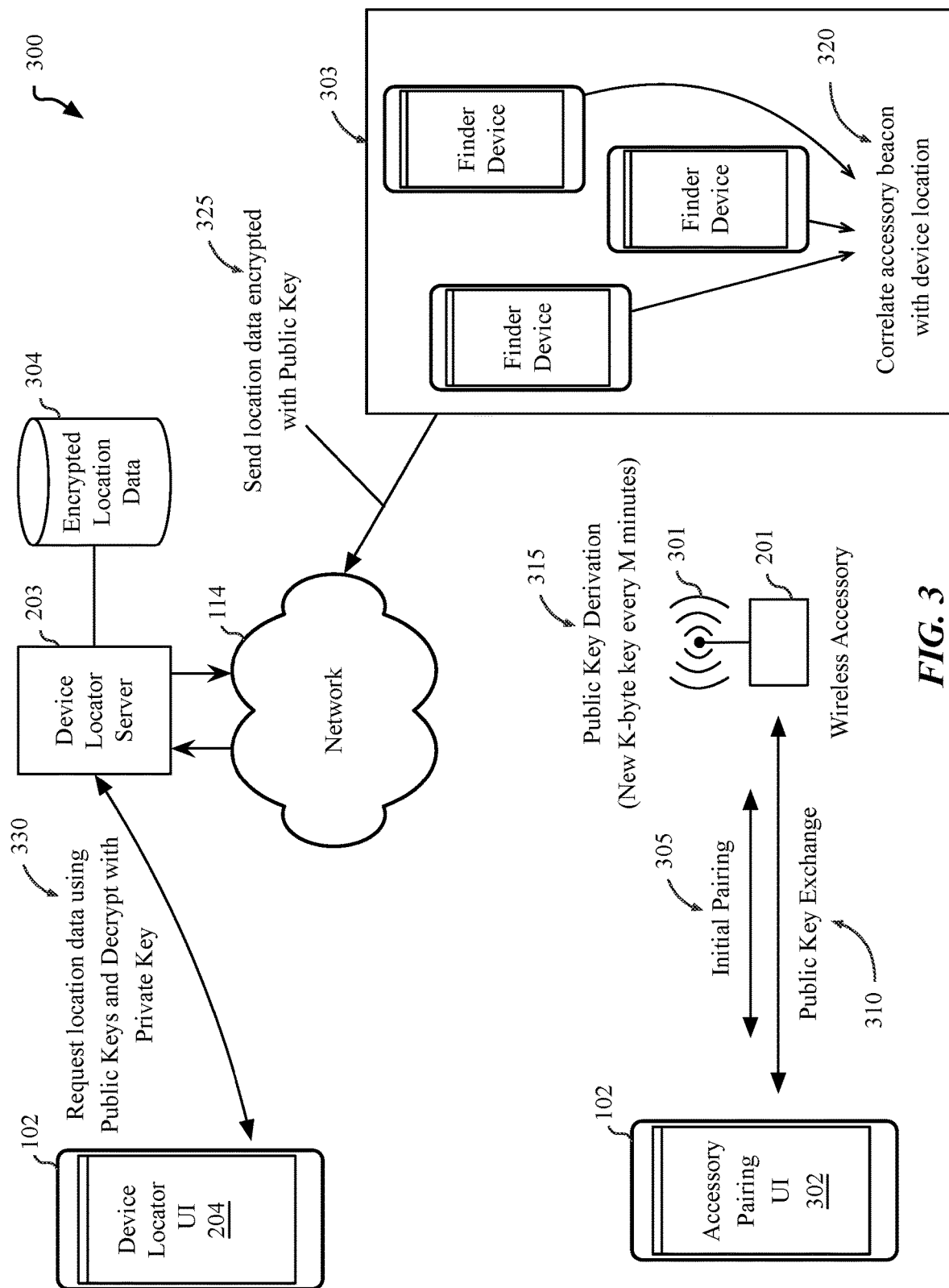
FIG. 3 illustrates a system for pairing and locating a wireless accessory, according to embodiments described herein.

FIG. 3 illustrates a system 300 for pairing and locating a wireless accessory, according to embodiments described herein. In one embodiment a mobile device 102 of a user of the wireless accessory 201 can present an accessory pairing UI 302 by which the user can pair the mobile device 102 with the wireless accessory 201. During an initial pairing (305) between the mobile device 102 and the wireless accessory, a public key exchange (310) can be performed between the mobile device and the wireless accessory. In one embodiment, during the public key exchange (310) the mobile device 102 and the wireless accessory 201 exchange public keys of public key pairs generated by the device and the accessory. In one embodiment the public key exchange (310) is a one-way transfer, in which the mobile device 102 transmits a public key of a public/private key pair to the wireless accessory 201. Alternatively, or additionally, the public key exchange (310) may be a Diffie-Hellman key exchange in which the device and the accessory establish a shared secret between two parties. In one embodiment, the public key exchange (310) additionally uses elliptic curve cryptography to establish the shared secret. For example, Elliptic-curve Diffie-Hellman (ECDH) can be used to enable the establishment of a public key pair and one or more shared secrets. In one embodiment, the one or more shared secrets include an anti-tracking secret, which can the wireless accessory 201 to periodically derive additional public keys.

After the wireless accessory 201 has been paired with the mobile device 102, the wireless accessory 201 can periodically broadcast a beacon signal 301 that includes device status information and a beacon identifier. In one embodiment the beacon identifier is a public key derived from a shared secret that is established during the public key exchange (310). Additionally, the wireless accessory 201 can periodically perform a public key derivation (315) to generate a new public key and begin broadcasting the new public key as the beacon identifier. The public key is a K-byte key, with a new K-byte key generated every M minutes. The value K and M can vary between embodiments. In one embodiment, a K value of 28 bytes is used. In one embodiment, a K value of 27 bytes is used. The value K can be determined at least in part based on the beacon length associated with the wireless protocol used to transmit the beacon signal 301. In one embodiment, the beacon signal can transmit a variant of beacon advertisement packet associated with a low-energy radio protocol, such as Bluetooth Low Energy.

The value M, in one embodiment, is 15 minutes, such that a new K-byte key is generated every 15 minutes. The public key can be derived deterministically based on a timestamp and an anti-tracking secret generated during the public key exchange 310. The public key derivation (315) process enables the wireless accessory 201 to use different keys over time, preventing the long-term association with a specific key with a specific device. The key can be derived based on an anti-tracking secret known only to the mobile device 102 and the wireless accessory 201, allowing the mobile device 102, and only the mobile device, to determine which public key will be broadcast by the wireless accessory 201 at any given timestamp. The anti-tracking secret can be generated along with an ECDH public key and transferred to the wireless accessory 201. The anti-tracking secret can then be used to enable the wireless accessory 201 to generate a sequence of public keys $P_i$. In one embodiment, the sequence of public keys $P_i = \lambda_i \cdot P$, which defines a group operation between a scalar or exponent value $\lambda_i$ and group elements, such as, for example, Elliptic Curve points P. The scalar or exponent value $\lambda = KDF(AT, i)$, where KDF is a key derivation function, AT is the anti-tracking secret, and i is a counter or timestamp.

In one embodiment, backtracking resistance can be enabled to protect the anti-tracking secret in the event the wireless accessory 201 is compromised. When backtracking resistance is enabled, the anti-tracking secret is transferred to the wireless accessory 201 but is not retained by the wireless accessory. Instead, the accessory computes a value $\lambda_{i+1} = H(\lambda_i \| time)$, with $\lambda_0 = AT$ and H being a cryptographic hash function. The wireless accessory 201 then stores $\lambda_i$ for a given time period i. If the wireless accessory 201 is compromised, only $\lambda_i$ for current and future values of i is exposed, without exposing the anti-tracking secret AT. In one embodiment, backtracking resistance is performed by periodically writing $\lambda_i$ to non-volatile memory of the wireless accessory 201.

In one embodiment the wireless accessory 201 can transmit the beacon signal 301 every two seconds, although other beacon rates can be used, and the beacon rate can vary under certain circumstances. For example, the wireless accessory 201 can decrease a beacon rate when in a near-owner state. Beacon rate can also vary based on accelerometer triggered events. For example, the wireless accessory 201 can increase the beacon rate when in an alarm state, which can be triggered by the accelerometer on the wireless accessory 201.

The wireless accessory 201 can enter the near-owner state if, after transmitting the beacon signal 301, the wireless accessory 201 receives a reply from the mobile device 102 associated with the user of the accessory, which indicates that the mobile device 102 is within range of the wireless accessory. Additionally, while the wireless accessory is in the near-owner state, the amount of data transmitted by the beacon signal 301 may be reduced. In one embodiment, the rate at which new public keys are generated can also be reduced while the wireless accessory is in the near-owner state.

The wireless accessory 201 can enter an alarm state upon receiving a message from the mobile device 102 that indicates that the wireless accessory 201 should enter the alarm state. When in the alarm state, the wireless accessory can initially enter an armed state in which the wireless accessory 201 can reduce or cease the transmission of locator beacon signals, although other types of wireless signaling can persist. The wireless accessory 201 can remain in the armed state until the state is deactivated by the mobile device 102 or alarm is triggered. The alarm can be triggered, in one embodiment, upon detection of movement, for example, via an accelerometer within the wireless accessory 201. The alarm can also be triggered, in one embodiment, upon detection that the wireless accessory has moved out of range of the mobile device and is no longer in the near-owner state. When the alarm is triggered, the rate at which the beacon signal 301 can be increased, to increase the speed by which the wireless accessory 201 can be located.

The beacon signal 301 transmitted by the wireless accessory 201 can be detected by a set of finder devices 303, which are other electronic devices that can receive the beacon signal transmitted by the wireless accessory and are transmit location and other data associated with the beacon signal 301 to the device locator server 203 via the wide area network 114. In one embodiment the set of finder devices 303 include variants of the mobile device 102 or can be other types of electronic devices. The set of finder devices 303 can include a variant of the finder device 202 of FIG. 2 and can determine similar location determination techniques. For example, the set of finder devices can perform operations (320) to correlate the beacon signal 301 received from the wireless accessory 201 with a device location associated with the finder device. As described with respect to FIG. 2, the device location can be determined via a satellite positioning service or a terrestrial positioning system that uses RF signals received from wireless base stations (e.g., Wi-Fi access points or cell tower transmitters). In one embodiment the set of finder devices 303 can also include stationary devices such as smart speaker devices, televisions, or television set top boxes that can receive the beacon signal 301.

The set of finder devices 303 can encrypt the location data with the beacon identifier (e.g., public key) received within the beacon signal 301 and send the location data (325) to the device locator server 203. The data sent by the set of finder devices 303 is send anonymously and no identifying information for the finder devices is stored with the data sent by the finder devices.

The device locator server 203 can store encrypted location data in a data store 304, which in one embodiment can be a distributed database having multiple nodes. Hashes of the beacon identifier/public key of an accessory can be sent along with encrypted location data. The encrypted location data can be stored to a database node based on a hash of the beacon identifier. The encrypted location data can be indexed by the device locator server 203 using the hash of the beacon identifier. Sending the hash of the beacon identifier instead of the full beacon identifier prevents the storage of the full beacon identifier to the server. Other information can also be sent and stored with the location data, either in an encrypted or unencrypted state. The other information can include timestamps for when the beacon signal 301 was received, RSSI information for the received beacon, and/or ranging information determined, for example, via UWB ranging.

When the user or owner of the wireless accessory 201 wishes to locate the accessory, the user or owner can access the device locator UI 204 on the mobile device 102. The device locator UI 204 can be associated with a device locator application or feature of the mobile device 102. The device locator UI 204 may also have a web-based interface that can be accessed from the mobile device 102 or another type of electronic device, such as a laptop or desktop device. The mobile device 102, upon loading the device locator UI 204, can send a request (330) for location data to the device locator server 203. The request 330 can include a set of public keys or public key hashes, which can serve as beacon identifiers for the beacon data. The mobile device 102 can generate the set of public keys based on the secret information held by the mobile device 102 and the wireless accessory 201 and the timestamps over which the mobile device 102 wishes to receive location data. In one embodiment the set of public keys is the sequence of public keys $P_i$ that are generated based on the anti-tracking secret. The sequence of public keys $P_i$ corresponds to a matching sequence of private keys $d_i$. The mobile device 102 can generate the sequence of public keys, as well as the corresponding sequence of public keys $d_i$, where i is a counter or timestamp. In one embodiment, the mobile device 102 can generate and send the previous 24 hours of public keys (or hashes of the 24 hours of public keys) within the request 330. If no data is found for 24 hours of public keys, the mobile device 102 can send generate keys for an earlier period, back to a pre-determined location data retention limit.

In one embodiment the encrypted location data is stored and indexed based on a hash of the public key instead of the public key to prevent the provider of the location service data from storing data that can be used to tie the encrypted location data to a specific device, and thus a specific user or user account. The finder device can send the hash of the public key that is broadcast within the beacon signal 301 associated with an observation location. The owner of the device can query the device locator server 203 using a hash of the public key that is determined for a query period.

In some embodiments, if a location query is to be performed via the web-based interface from an electronic device, such as a laptop or desktop device, keys to enable the decryption of the location data may be required to be sent to the electronic device. In one embodiment, decryption keys for the location data may be sent to the server that provides the web-based interface to enable the server to decrypt location data, at least while the location data is being viewed through the web-based interface. Before location data is displayed via the web-based interface, a notice may be presented to inform the user that location decryption keys are being temporarily shared with the web-based interface server to enable location data to be decrypted and presented. In one embodiment, the sharing of the location decryption keys can be performed via an automatic and temporarily delegation of location query rights with a proxy account associated with the web-based interface.

In one embodiment, the wireless accessory 201 can be placed in a light lost mode. In the light lost mode, a set of future public keys can be generated for the wireless accessory and transmitted to the device locator server 203. The device locator server 203 can then notify the mobile device 102 if any location data is received that correspond with a key in the set of future public keys. In one embodiment, a finder device that sends a location for a wireless accessory that is in the light lost mode can be directed by the device locator server 203 to relay a message to the wireless accessory 201 that notifies the wireless accessory that it is in the light lost mode. A similar mechanism can be used to relay a message to the wireless accessory 201 that places the accessory in an explicit lost mode. The explicit lost mode can be enabled by the user via the device locator UI 204. In the explicit lost mode, the wireless accessory 201 cannot be paired with another device unless unlocked by the owner.

Figure 4A:
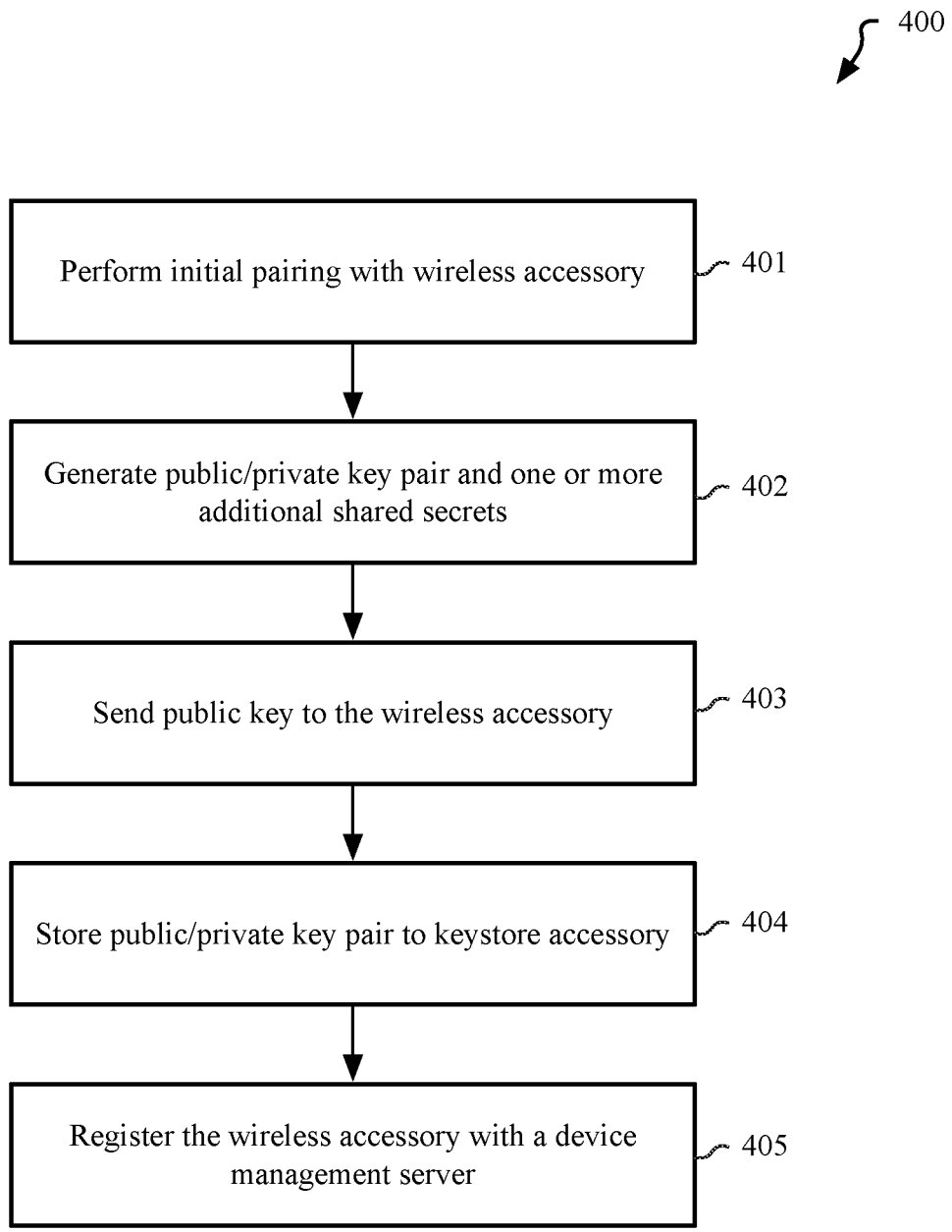
FIG. 4A-4C are flow diagrams illustrating methods for use with the device locator systems described herein.
Figure 4B:
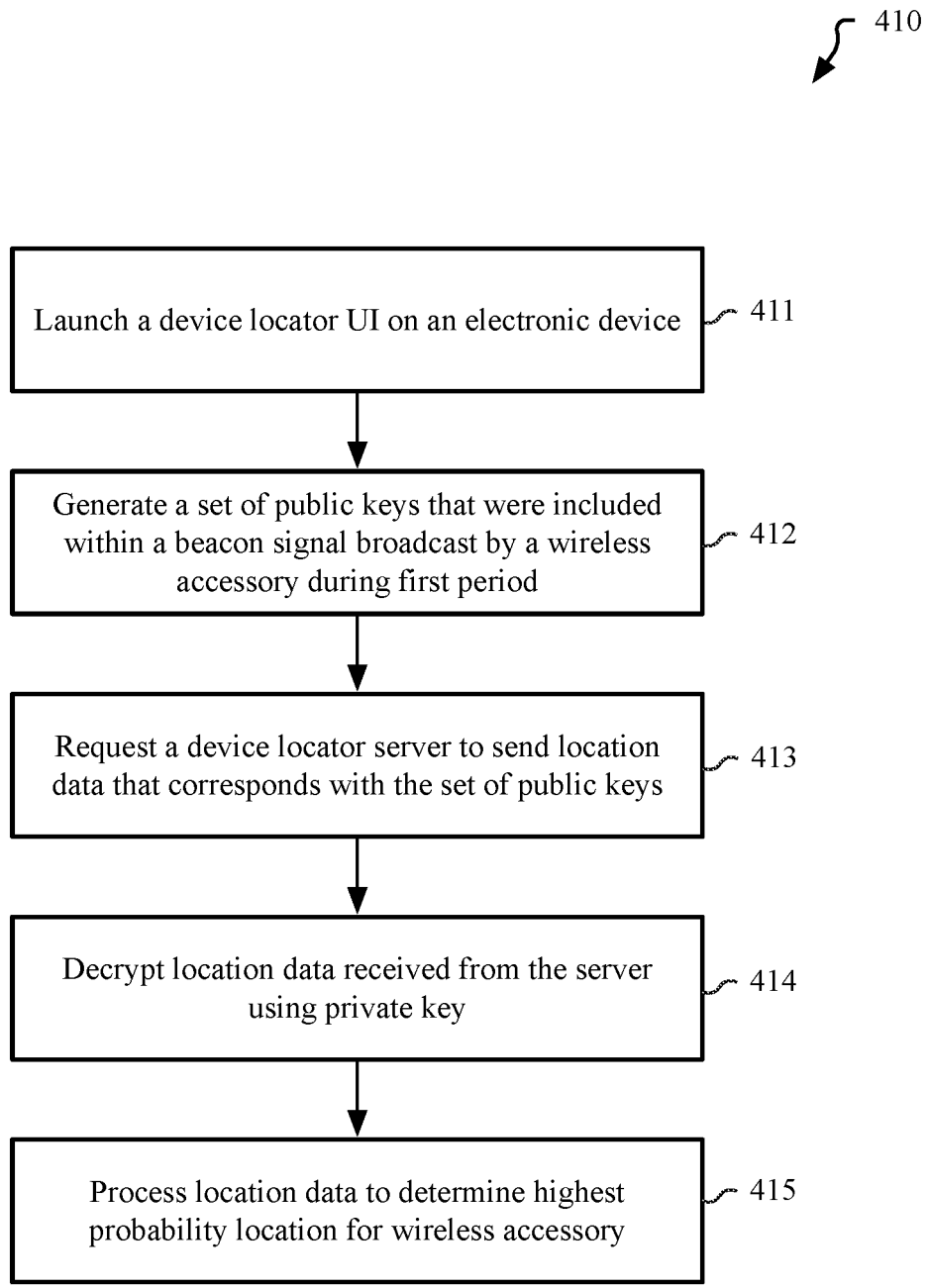
Figure 4C:
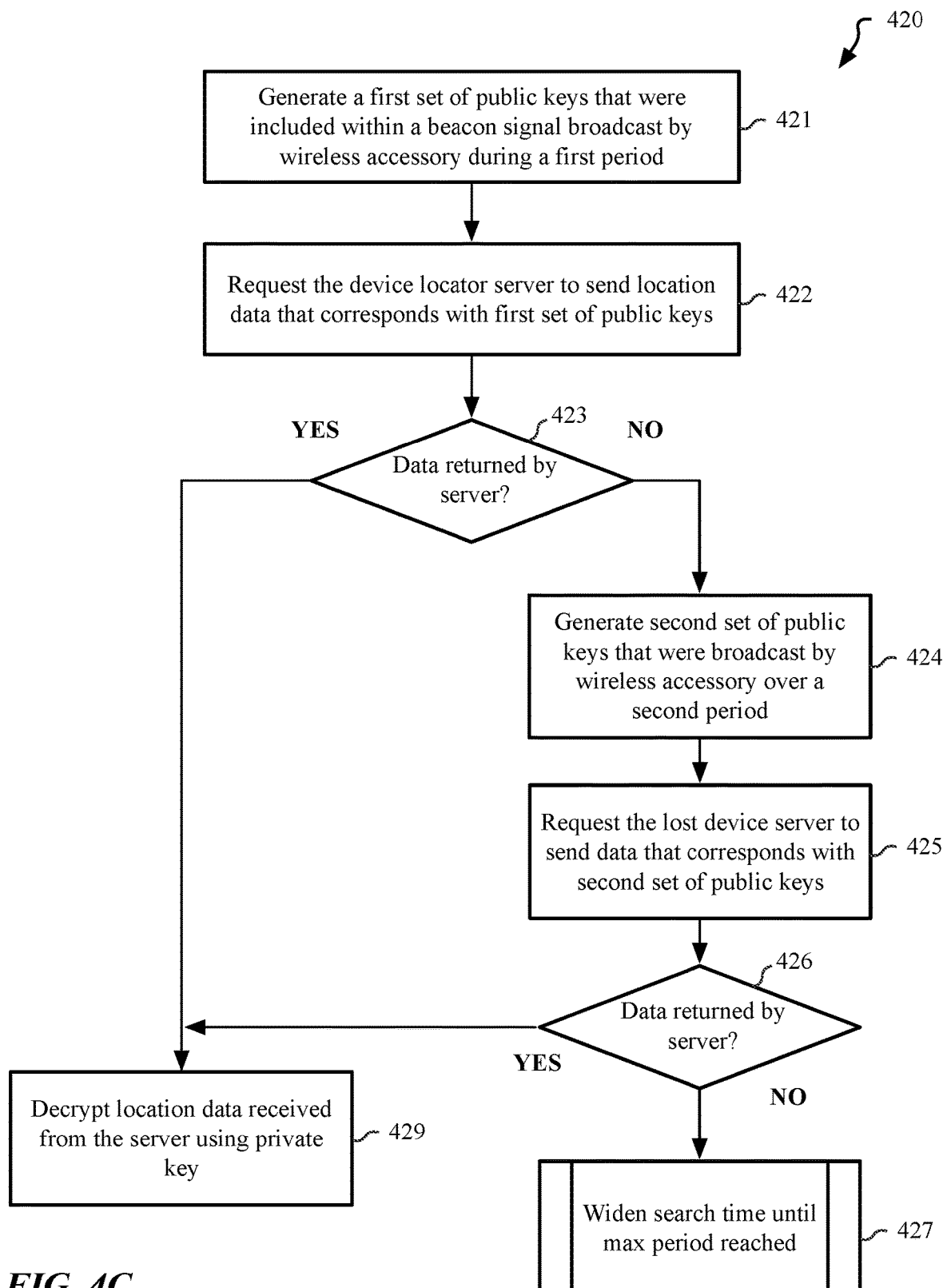

FIG. 4A-4C are flow diagrams illustrating methods for use with the device locator systems described herein. FIG. 4A illustrates a method 400 to pair a mobile device with a wireless accessory. FIG. 4B illustrates a method 410 to determine a location for a wireless accessory via a device locator server. FIG. 4C illustrates an additional method 420 to determine a location for a wireless accessory via a device locator server. Aspects of method 400, 410, and 420 are also illustrated in FIG. 2 and FIG. 3, as described above. For example, the description of the operations below refers to the mobile device 102, wireless accessory 201 and device locator server 203.

As shown in FIG. 4A, method 400 includes an operation (block 401) that performs an initial pairing with a wireless accessory. The initial pairing can be a Bluetooth pairing or another type of pairing using other wireless radio technologies. During the initial pairing, the mobile device and the wireless accessory can exchange identifiers, passkeys, or other credentials that enables a wireless data exchange to be performed between a mobile or another electronic device and the wireless accessory. On one embodiment the initial paring with the wireless accessory can include the exchange of credentials associated with the wireless protocol for which the pairing is performed, allowing all data exchanged wirelessly to have at least a first layer of encryption.

The mobile device can then generate a public/private key pair and one or more additional shared secrets (block 402). The device can then send the public key and one or more additional shared secrets to the wireless accessory (block 403). A variety of key generation techniques can be used. In one embodiment, a variant of ECDH is used to generate a public key pair for encryption. In one embodiment, the one or more additional shared secrets can include an anti-tracking secret that enables the wireless accessory to derive a new public key based on an existing public key.

After generating the public/private keypair and one or more additional shared secrets, the mobile device can store public/private key pair to keystore (block 404). In one embodiment the keystore is a cloud-based keystore that can be synchronized with other devices associated with the same cloud services account, or family of cloud services accounts, to which the mobile device and wireless accessory are associated. The cloud-based keystore allows the wireless accessory to be located by other synchronized devices. The mobile device can then register the wireless accessory with a device management server (block 405). Registering the wireless accessory with the device management server can form an association between the wireless accessory and the cloud services account to which the mobile device is associated. The device management server can be associated with other cloud-based servers that are used to facilitate cloud-based services accessible to the mobile device, such as the device locator server 203 of FIG. 2 and FIG. 3.

As shown in FIG. 4B, method 410 includes an operation in which an electronic device launches a device locator UI (block 411). In response to launching the device locator UI, the electronic device, which can be a mobile device as described herein, or another electronic device associated with the same cloud services account as the mobile electronic device, can perform an operation to generate a set of public keys that were included within a beacon signal broadcast by a wireless accessory during a first period (block 412). The first period can be, for example, a previous 24 hours. The electronic device is aware of the frequency in which the wireless accessory is to generate new public keys and, using a shared secret generated with the wireless accessory, can generate a set of public keys that correspond with the keys that were generated by the wireless accessory over the first period. The electronic device can then send the set of public keys within a request for the device locator server to send location data that corresponds with the set of public keys (block 413). In one embodiment, location data sent by the server in response to the request will be encrypted using the public key transmitted as the beacon identifier of the wireless accessory. The electronic device can decrypt the encrypted location data received by the server using the private key generated during the initial pairing with the wireless accessory (block 414). The electronic device can then process the location data to determine the highest probability location for the wireless accessory (block 415).

Figure 10:
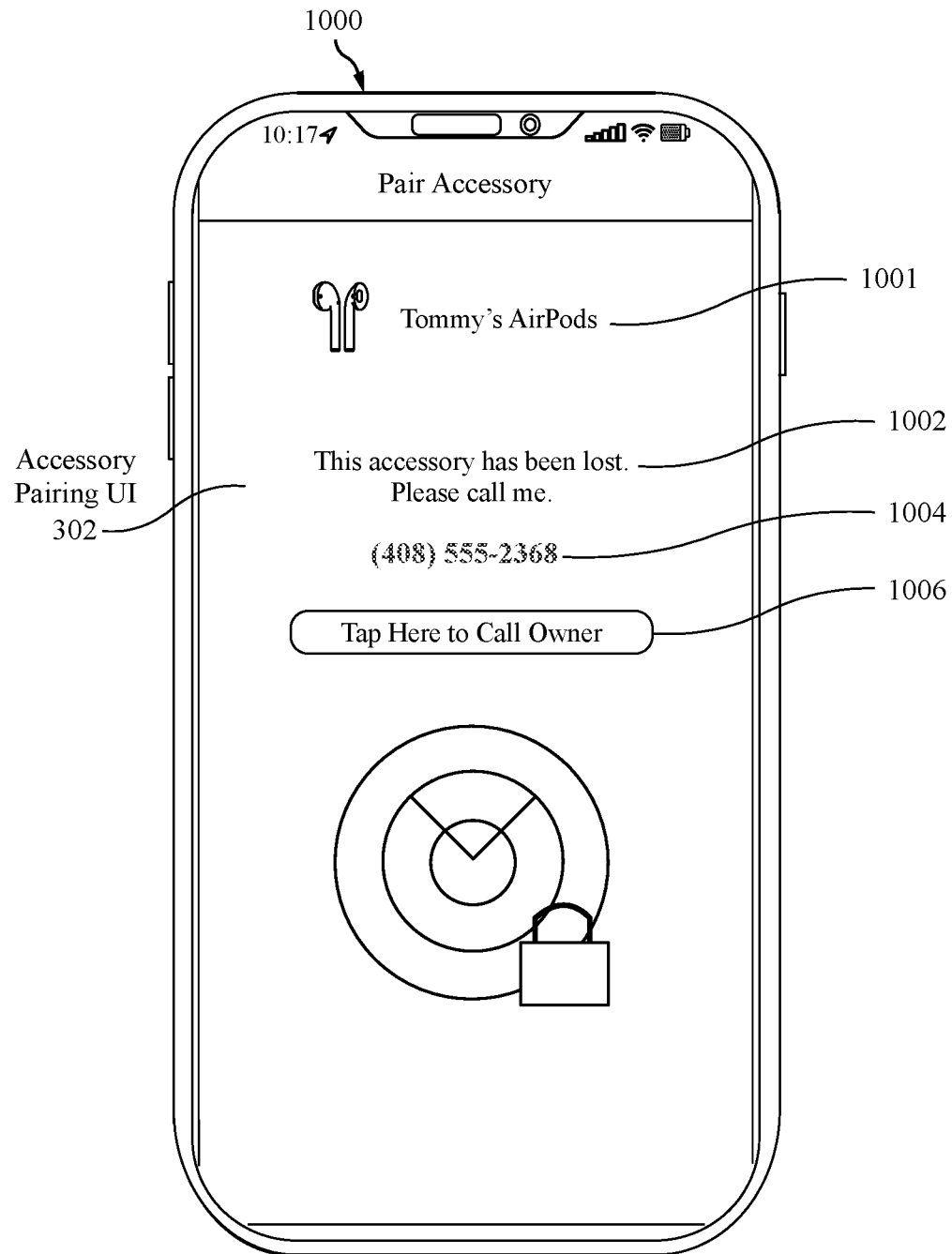
FIG. 10 illustrates an accessory pairing user interface that is displayed when attempting to pair with a lost wireless accessory, according to an embodiment.

Processing the location data can include a variety of different operations. In one embodiment the location data includes latitude and longitude information along with a timestamp for which the location was determined. The electronic device can triangulate based on the timestamps and remove noise or outlier locations. In one embodiment the location data specifies the location of the finder device that detected the beacon. The location data can additionally include UWB ranging information and/or RSSI information for the beacon detected by the finder device. The electronic device can analyze the UWB ranging information and/or RSSI information in context with the device locations to develop a more accurate location for the wireless accessory. Data that can be transmitted by a finder device and used for location processing is shown in FIG. 10 and described below.

As shown in FIG. 4C, method 420 includes operations that can be performed if the device locator server does not have location data to provide to the electronic device in response to a request. The electronic device can generate a first set of public keys that were included within a beacon signal broadcast by wireless accessory during a first period (block 421). The first period can be, for example, 24 hours, although other initial search periods can be used. The electronic device can perform a subsequent operation to request the device locator server to send location data that corresponds with first set of public keys (block 422). If the data is returned by the server (block 423, "yes"), the electronic device can decrypt the location data received from the server using the private key that corresponds with the set of public keys (block 429).

If data is not returned by the server (block 423, "no") the electronic device can generate a second set of public keys that were included within a beacon signal broadcast by the wireless accessory during a second period (block 424). The second period can be the 24, 48, or another number of hours before the first period. The electronic device can then request for the device locator server to send data that corresponds with the second set of public keys (block 425). If, in response to the request, data is returned by the server (block 426, "yes"), method 420 can proceed to block 429, in which the electronic device decrypts the received data. If data is not returned by the server (block 426, "no"), or the server sends a reply that indicates data is not available, method 420 includes for the electronic device can widen the search time by requesting successively older time periods until the max period is reached (block 427).

Figure 5:
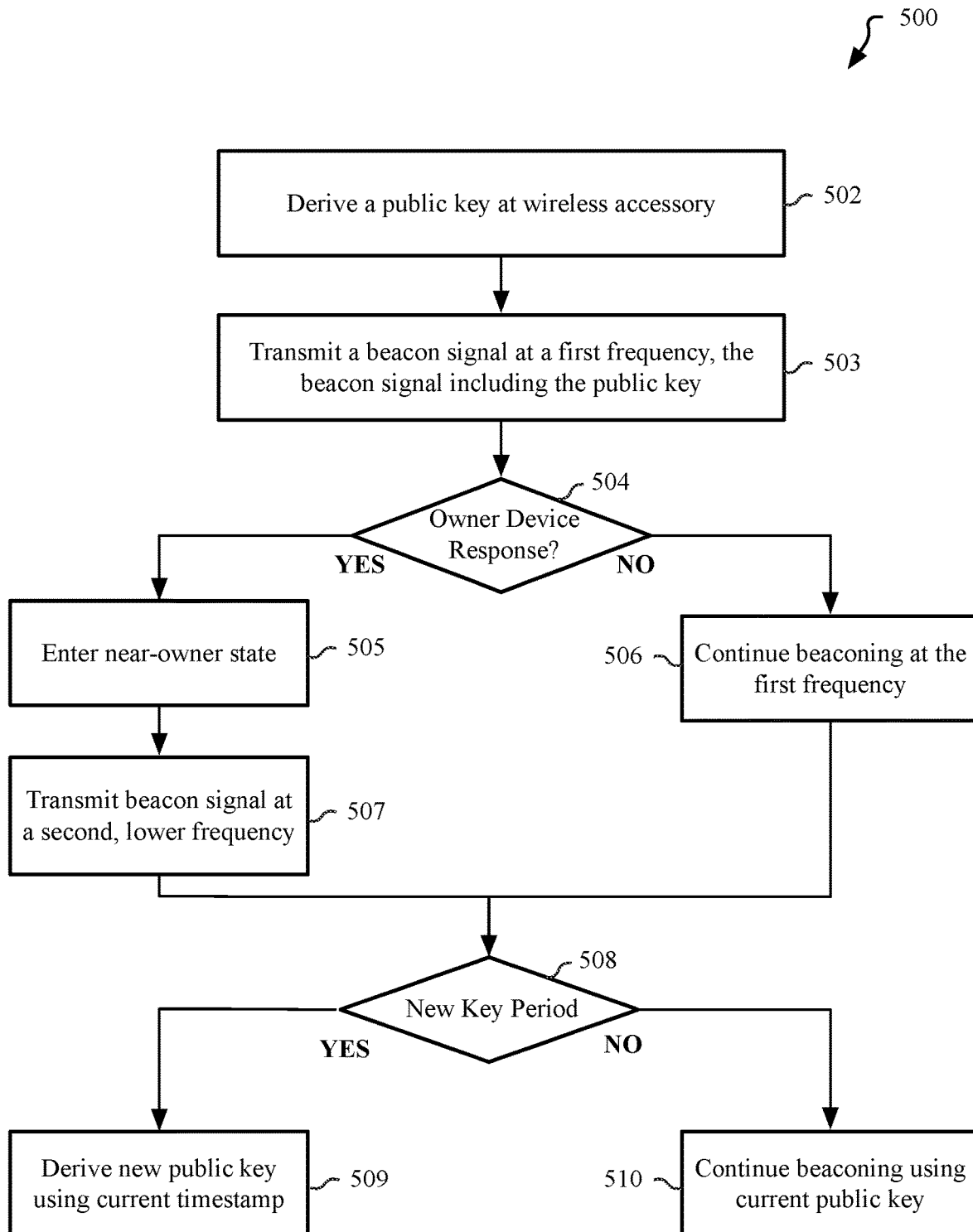
FIG. 5 is a flow diagram illustrating a method of broadcasting a signal beacon at a wireless accessory, according to an embodiment.

FIG. 5 is a flow diagram illustrating a method 500 of broadcasting a signal beacon at a wireless accessory, according to an embodiment. Aspects of method 500 are also illustrated in FIG. 2 and FIG. 3. Method 500 includes for the wireless accessory to derive a public key (block 502). The public key can be derived based on a shared secret and a timestamp determined based on a clock or time keeping device of the wireless accessory. The wireless accessory can then transmit a beacon signal at a first frequency, where the beacon signal includes the public key (block 503). The first frequency can vary, and in one embodiment is one beacon every two seconds.

After transmitting a beacon signal, the wireless accessory can listen for a response from the owner device. If the wireless signal receives a response from the owner device (block 504, "yes"), the wireless accessory can enter a near-owner state (block 505) and begin to transmit the beacon signal at a second, lower frequency (block 507). If the wireless accessory does not receive a response from the owner device (block 504, "no"), the wireless accessory can continue beaconing at the first frequency (block 506).

Method 500 additionally includes for the wireless device, while beaconing, to rotate the public key every M minutes, where the value of M can vary across embodiments and/or based on the device state. Based on a timer expiration, counter, or another mechanism, the wireless accessory can determine whether the accessory has entered a new key period (block 508). While the wireless accessory has not entered a new key period (block 508, "no"), the accessory can continue beaconing using the current public key (block 510). When the wireless accessory detects that it has entered a new key period (block 508, "yes") the accessory can derive a new public key using the current timestamp (block 509). In one embodiment the new public key can be derived using an existing public key, a timestamp, and an anti-tracking secret.

Figure 6A:
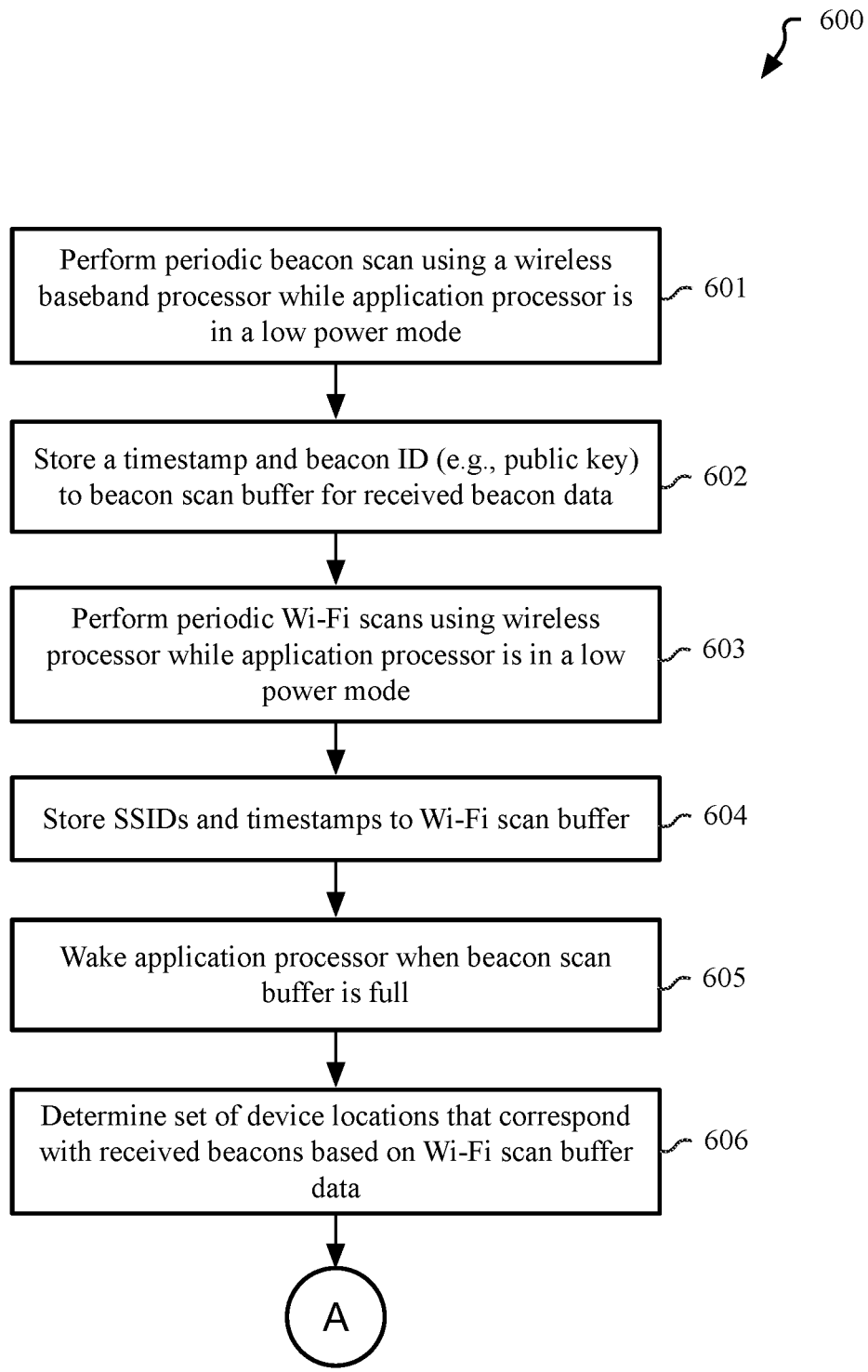
FIG. 6A-6B illustrate operations of a method that can be performed by a finder device, according to embodiments described herein.
Figure 6B:
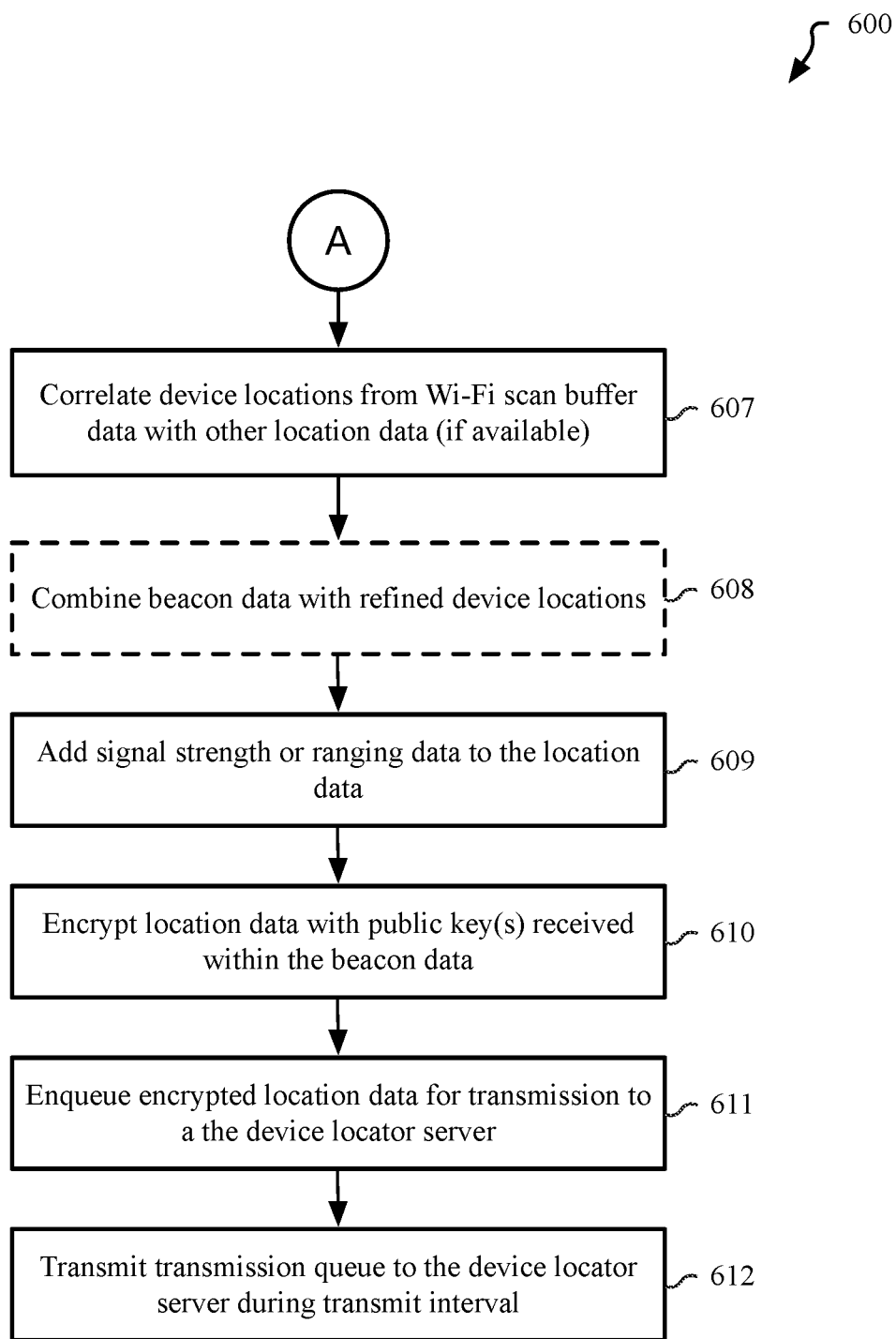

FIG. 6A-6B illustrate operations of a method 600 that can be performed by a finder device, according to embodiments described herein. Aspects of method 600 are also illustrated in FIG. 2 and FIG. 3.

As shown in FIG. 6A, method 600 includes for the finder device to perform a periodic beacon scan using a wireless baseband processor while an application processor of the finder device is in a low power mode (block 601). While the beacon scan can also be performed when the application processor is active, beacon scans can be performed by the wireless processor and a wireless radio receiver as a low power operation while the finder device is idle, inactive, or otherwise in a low power state. The finder device can store a timestamp and a beacon identifier to a beacon scan buffer for any beacon data received by the finder device (block 602). The beacon identifier, in one embodiment, is a public key that is generated by the wireless device based on a timestamp and a shared secret generated with the mobile device of the owner.

Method 600 additionally includes for the finder device to perform periodic Wi-Fi scans using the wireless processor while application processor is in a low power mode (block 603). While the Wi-Fi scans can also be performed when the application processor is active, Wi-Fi scans can be performed by the wireless processor and a wireless radio receiver as a low power operation while the finder device is idle, inactive, or otherwise in a low power state. The finder device can then store Wi-Fi service set identifiers (SSIDs) and scan timestamps to a Wi-Fi scan buffer on the finder device (block 604).

In one embodiment, the Wi-Fi scan buffer is a rolling buffer that stores the most recently detected SSIDs, while overwriting older detected SSIDs. In one embodiment the beacon scan buffer can be a fixed-size buffer having space for a pre-determined number of entries. The finder device can wake the application processor when the beacon scan buffer becomes full (block 605) and correlate those beacon scan with the most recently detected SSIDs in the Wi-Fi scan buffer. That correlation can enable the finder device to determine a set of device locations that correspond with received beacons based on Wi-Fi scan buffer data (block 606).

Method 600 continues in FIG. 6B and includes for the finder device to correlate device locations from the Wi-Fi scan buffer data with other location data if other location data is available (block 607), to generate refined device locations. If refined device locations are generated, the finder device can optionally combine the beacon data with refined device locations (block 608). The finder device can also add signal strength (RSSI) or ranging data to the location data (block 609). The signal strength and ranging data (e.g., UWB ranging data) can be gathered when the beacon signal is received by the finder device. The finder device can then encrypt the location data with one or more public keys received within the beacon data (block 610). The signal and ranging data may be encrypted along with the location data or can be send unencrypted along with the encrypted location data. The finder device can enqueue encrypted location data for transmission to the device locator server (block 611). The device locator server can be one of multiple cloud services servers to which communication is generally performed in a batched and throttled manner. A batch of encrypted data can be gathered and placed in the transmission queue until a transmit interval arrives, during which the finder device can transmit data to the cloud services servers (block 612).

Figure 7:
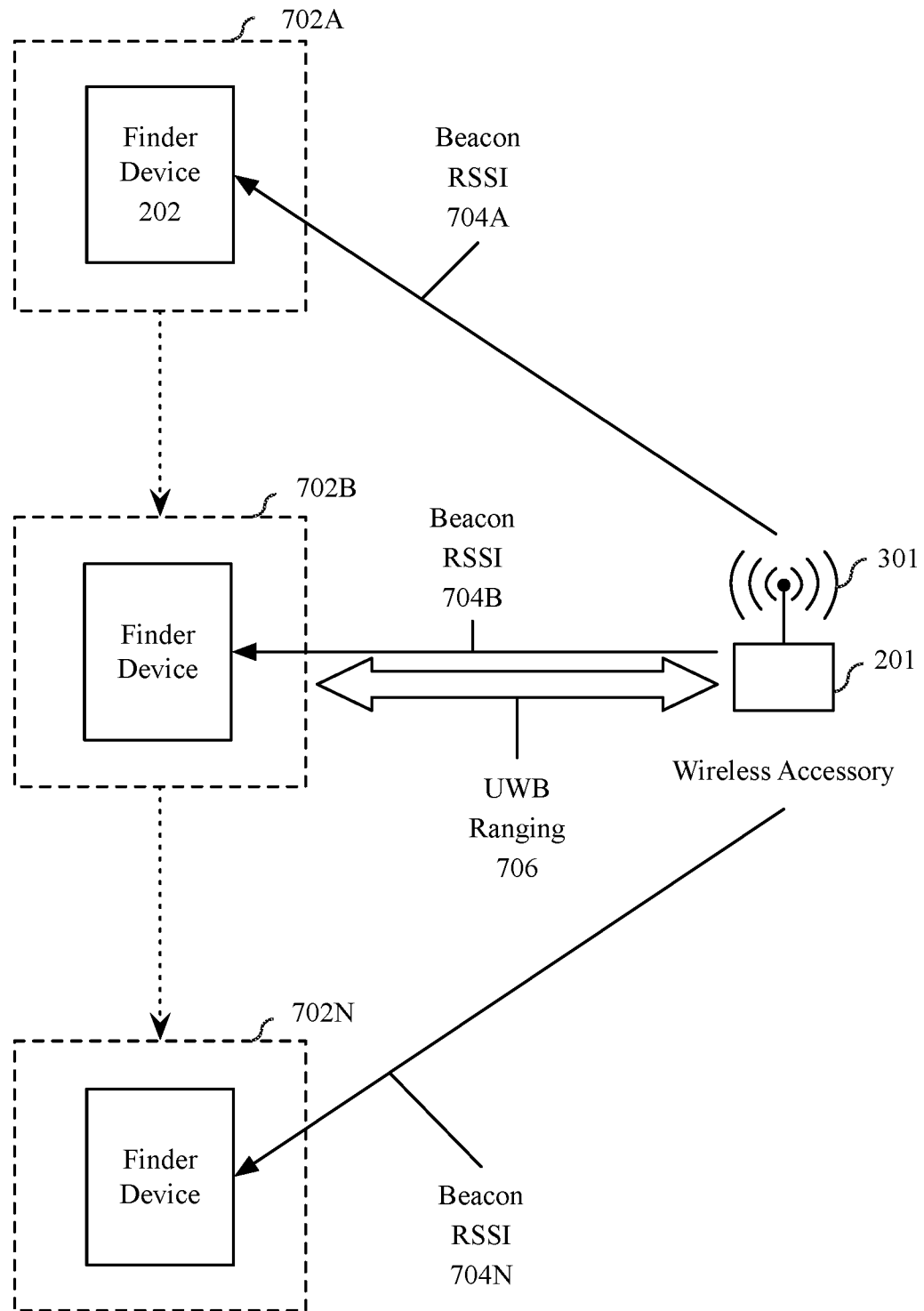
FIG. 7 illustrates the gathering of signal and ranging data by a finder device, according to an embodiment.

FIG. 7 illustrates the gathering of signal and ranging data by a finder device, according to an embodiment. In one embodiment, the finder device 202 can gather signal strength information (e.g., RSSI 704A-704N) for a beacon signal 301 received from the wireless accessory 201 across multiple locations 702A-702N. The finder device 202 can also represent multiple finder devices, such as the set of finder devices 303 in FIG. 3, where each finder device detects the beacon signal at a different location. Each finder device 202 can send different locations and signal strengths and the location and signal strength data received from the multiple finder devices will be aggregated by the device locator server. In one embodiment, where a finder device and the wireless device each include UWB radios, UWB ranging 706 can be performed if the finder device and the wireless device are within range of UWB transmissions. UWB ranging and signal strength data can be transmitted along with location data for the finder devices to the device locator server.

The owner device can retrieve the RSSI or UWB information from the device locator server along with location data, which in one embodiment is provided the form of latitude and longitude information, along with timestamps for which the locations were determined. The owner device can then use the location data, timestamps, and signal information to triangulate a most probable location for the wireless accessory 201.

Figure 8:
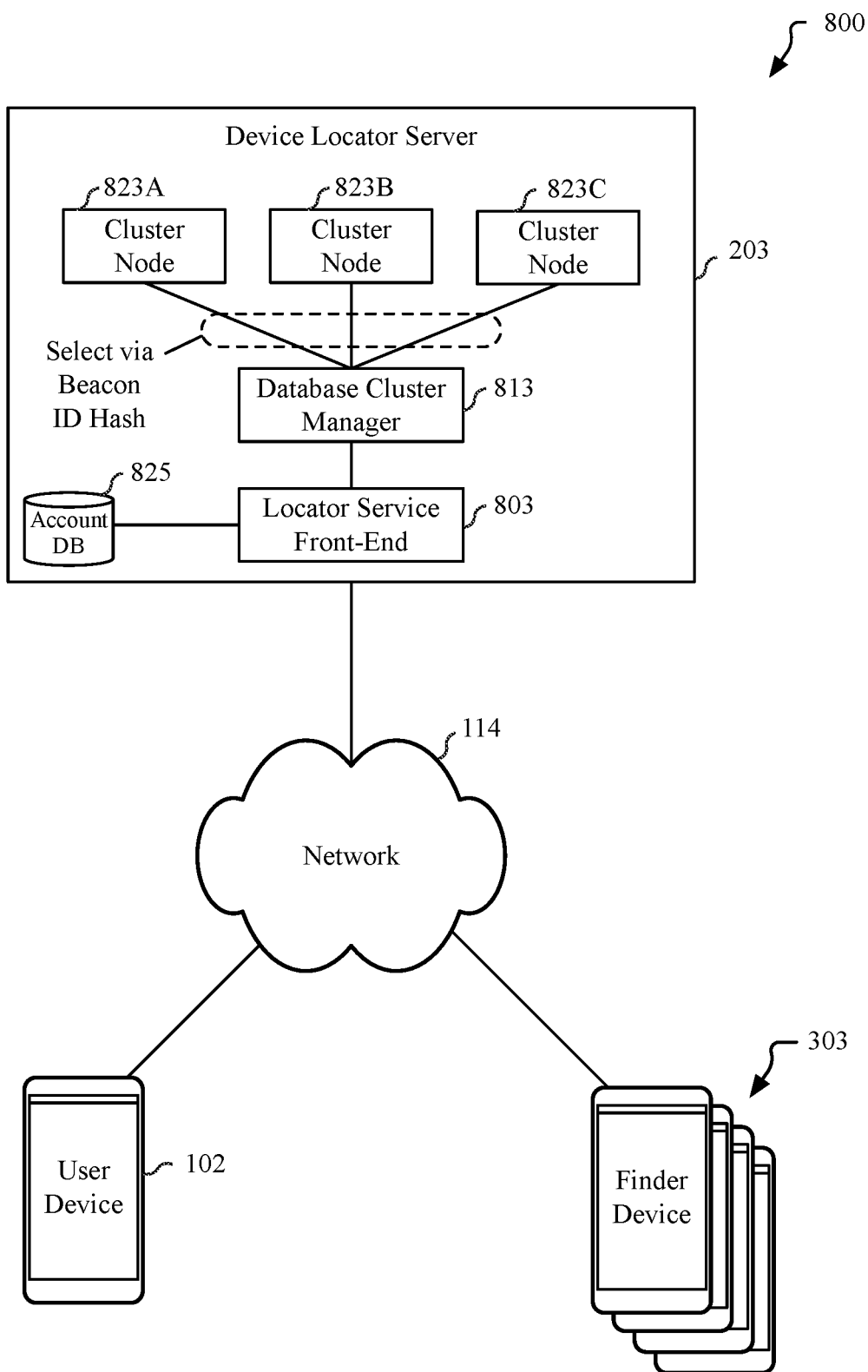
FIG. 8 illustrates a networked system for locating devices and wireless accessories, according to an embodiment.

FIG. 8 illustrates a networked system 800 for locating devices and wireless accessories, according to an embodiment. The system 800 also illustrates an exemplary server architecture for the device locator server 203, according to an embodiment. In one embodiment the device locator server 203 is a cluster of interconnected server devices, which may be physical or virtual servers within a single datacenter or distributed across multiple datacenters and/or geographic locations. As described above, the device locator server 203 can communicate with a mobile device 102 of an accessory owner or user and the set of finder devices 303 over a wide area network 114. The mobile device 102 includes a UI provided by a local or web application that enables the location of a wireless accessory and the finder devices 303 receive beacon signals from wireless accessories and transmits location data associated with the received signals to the device locator server 203.

In one embodiment the device locator server 203 includes a locator server front-end 803, an account database 825, a database cluster manager 813, and a set of database cluster nodes 823A-823C. The locator server front-end 803 is a front-end interface to which the mobile device 102 and the set of finder devices 303 can communicate. The account database 825 stores account profile data for accounts of a cloud service provider to which the mobile device 102 and the finder devices 303 are associated. The database cluster manager 813 can configure the database cluster nodes 823A-823C as a distributed location database that can store location, signal, and ranging data in association with beacon identifiers for signal beacons received by the set of finder devices 303.

In one embodiment, the account database 825 can contain a list of devices that are associated with each cloud services account. In response to a request to locate a given device, including a wireless accessory as described herein, the account database 825 can verify that the request is coming from a device that is authorized to request the location of the given device. In one embodiment, when a user launches a device locator UI and communicates with the locator service front-end 803, the locator service front-end can communicate with the account database 825 and provide a current or last known location for each device that is associated with a requesting user, including devices and/or wireless accessories associated with other users that are in a family of accounts associated with the requesting user.

In one embodiment, the database cluster manager 813 can select a database cluster node 823A-823C to which beacon data is to be stored by hashing the beacon ID associated with a set of location data. Each database cluster node 823A-823C can be associated with a range of hash values. The database cluster manager can then store location data to the cluster node that corresponds with the range of hash values associated with the hash of a given beacon ID. Although three database cluster nodes are illustrated, embodiments are not limited to any specific number of nodes and greater or fewer nodes may be used.

Figure 9A:
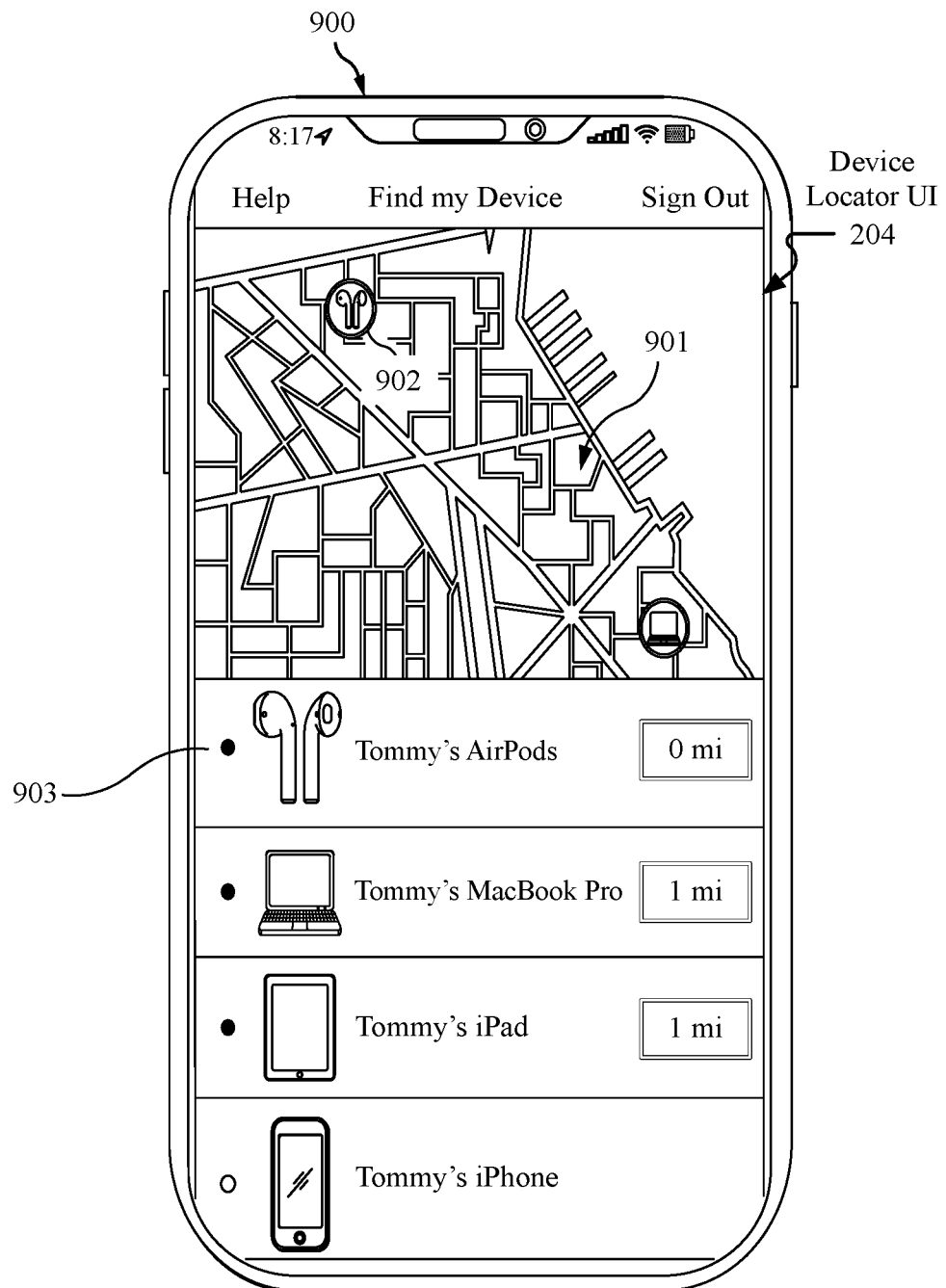
FIG. 9A-9C illustrate a device locator user interface, according to an embodiment.
Figure 9B:
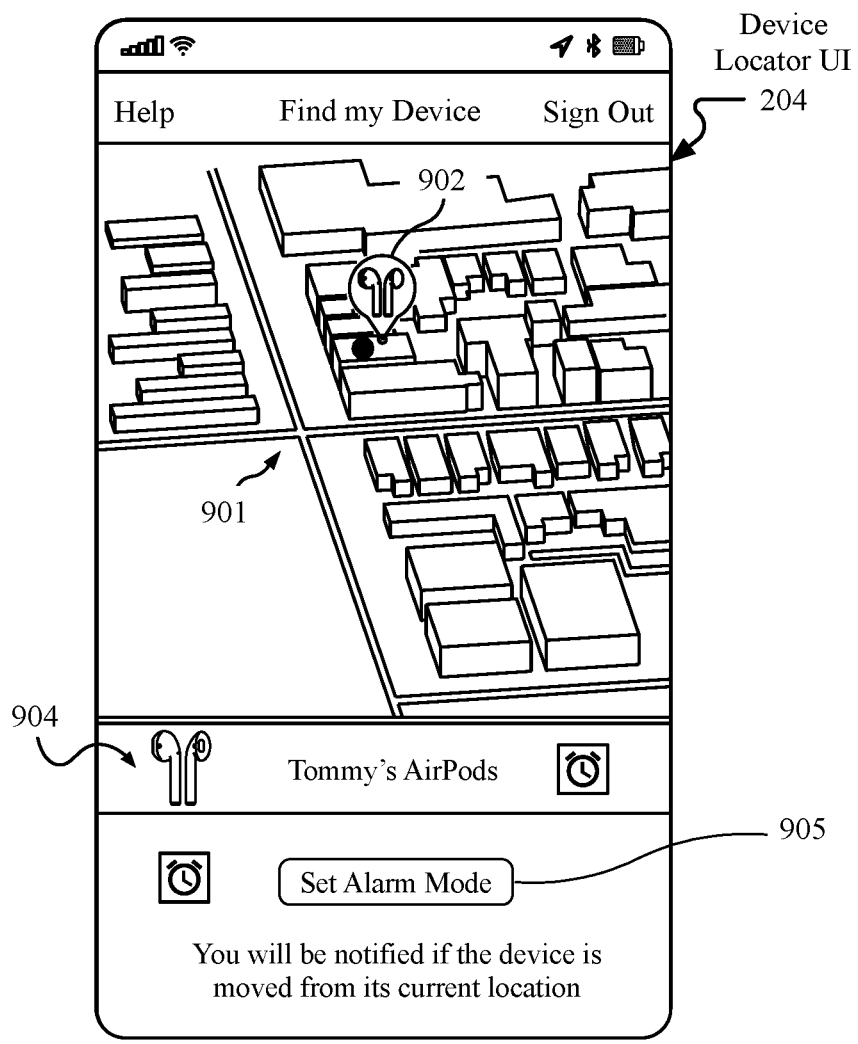
Figure 9C:
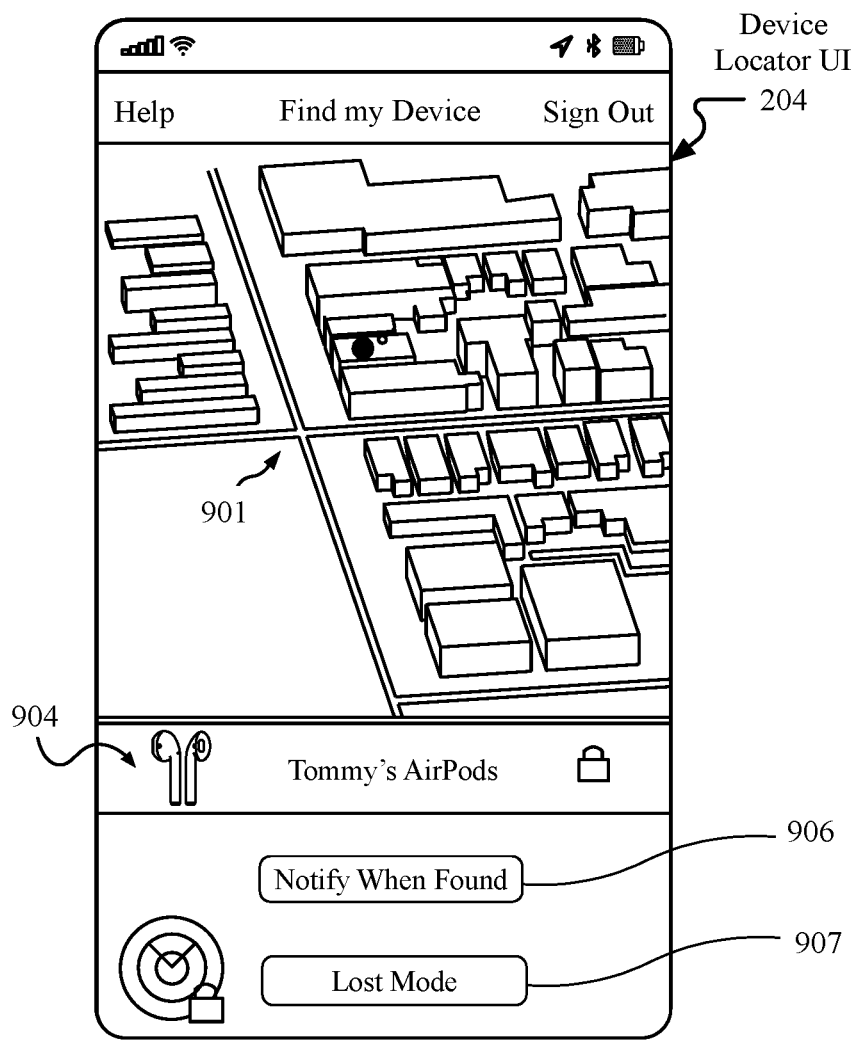

FIG. 9A-9C illustrate a device locator UI 204, according to an embodiment. FIG. 9A shows a first graphical user interface of the device locator UI 204, according to an embodiment, which shows a location for various electronic devices and wireless accessories of a user. FIG. 9B shows a second graphical user interface of the device locator UI 204, according to an embodiment, which enables a wireless accessory to be set to an alarm mode. FIG. 9C shows a third graphical user interface of the device locator UI 204, according to an embodiment, which enables a wireless accessory to be set to a lost mode.

As shown in FIG. 9A, the device locator UI 204 can be displayed on an electronic device 900, which can be a mobile device, or any other type of electronic device described herein. The device locator UI 204 can present a unified graphical interface through which multiple different types of devices and accessories can be located, including wireless devices with network or cellular access and wireless accessories without native network access. The device locator UI 204 can include a map 901 with a marker 902 that shows the current or last known location of a wireless device or accessory. The marker 902 can be an icon, image, graphic or any other user interface element that identifies the accessory and conveys a location for the accessory. A selectable element 903 in the device locator UI can present a description or name of the wireless device or accessory and can show an estimated distance between the wireless device or accessory and the current location of the electronic device 900.

As shown in FIG. 9B, the device locator UI 204 can present a second user interface that enables a wireless accessory to be set to an alarm mode. The second user interface can be displayed, in one embodiment, in response to the selection of the selectable element 903 shown in FIG. 9A. The second user interface can present a user interface element 904 that represents and/or describes the wireless accessory in question, as well as the map 901 and marker 902 that show the current or last known location of the wireless accessory. In one embodiment, the device locator UI 204 can present a selectable element 905, such as a button or another user interface element, that allows a user of the device locator UI 204 to place a selected wireless accessory into an alarm mode. While in the alarm mode, the wireless accessory can be configured to trigger a notification to the user if the wireless accessory is moved from its current location.

In one embodiment the wireless accessory can detect movement via an accelerometer or another type of motion sensor within the wireless accessory. The notification can be initiated by the wireless accessory by setting a flag in the data packet transmitted by the beacon signal of the wireless accessory that indicates the wireless accessory alarm has been triggered. In various embodiments, other trigger or notification modes can be used. In one embodiment, the alarm can optionally be triggered by the mobile device upon detection that the wireless accessory has moved out of range of the mobile device and is no longer in the near-owner state. In one embodiment, the alarm can optionally be triggered when the wireless accessory is out of range of, or otherwise cannot be located by, any of the devices associated with the account or family of user accounts to which the wireless accessory is associated.

As shown in FIG. 9C, the device locator UI 204 can present a third graphical user interface that enables a wireless accessory to be set to a lost mode. In one embodiment, when a wireless accessory cannot be located via the device locator UI 204, the map 901 will not display a marker that indicates a location for the accessory. The device locator UI 204 can present the user interface element 904 that represents and/or describes the wireless accessory in question and a set of selectable user interface elements. One selectable user interface element 906 can present the option to notify the user when the accessory is found. When notify when found is enabled, in one embodiment the wireless accessory can be placed into a light lost mode. The electronic device associated with the device locator UI 204 can generate a set of public keys that the wireless accessory will broadcast with the beacon signal during a future time period (e.g., next 24 hours, next 48 hours, etc.). If a signal is detected by a finder device using one of the future keys, the device locator server can notify one or more electronic devices associated with the user.

Another selectable user interface element 907 can place the wireless accessory into an explicit lost mode. When explicitly placed into lost mode, the wireless accessory will be unable to be paired with other devices until the accessory is unlocked by the user or owner that places the device into lost mode. When sending a request to place a wireless accessory into lost mode, the requesting user can be required to enter authenticating information to ensure that the requesting user is authorized to request that lost mode be initiated on the lost accessory. The authenticating information can include a username or password associated with an account of a user, such as a cloud services account to which the user, electronic device, and wireless accessory are associated. The authenticating information can also include biometric information, such as a fingerprint or facial recognition data.

In one embodiment, a message and contact information provided by the requesting user can be displayed on the user device to alert a person who finds the lost wireless accessory on how to contact the requesting user. In one embodiment, the message and contact information can be displayed when another user attempts to pair another electronic device with the lost accessory.

FIG. 10 illustrates an accessory pairing UI 302 that is displayed when attempting to pair with a lost wireless accessory, according to an embodiment. In one embodiment, when an electronic device 1000 that is different from the electronic device 9000 of FIG. 9 and is not associated with the registered user or owner of a wireless accessory attempts to pair with a lost wireless accessory, the accessory pairing UI of the electronic device can be displayed as shown in FIG. 10. In one embodiment, the accessory pairing UI 302 can display a name or description 1001 associated with the wireless accessory, as well as a message 1002 entered by the user of the accessory upon placing the accessory into lost mode. Contact information 1004 can also be displayed, along with a user interface element 1006, such as a button, that enables the electronic device 1000 to contact the requesting user by using the provided contact information 1004.

Embodiments described herein include one or more application programming interfaces (APIs) in an environment in which calling program code interacts with other program code that is called through one or more programming interfaces. Various function calls, messages, or other types of invocations, which further may include various kinds of parameters, can be transferred via the APIs between the calling program and the code being called. In addition, an API may provide the calling program code the ability to use data types or classes defined in the API and implemented in the called program code.

An API allows a developer of an API-calling component (which may be a third-party developer) to leverage specified features provided by an API-implementing component. There may be one API-calling component or there may be more than one such component. An API can be a source code interface that a computer system or program library provides to support requests for services from an application. An operating system (OS) can have multiple APIs to allow applications running on the OS to call one or more of those APIs, and a service (such as a program library) can have multiple APIs to allow an application that uses the service to call one or more of those APIs. An API can be specified in terms of a programming language that can be interpreted or compiled when an application is built.

In some embodiments, the API-implementing component may provide more than one API, each providing a different view of or with different aspects that access different aspects of the functionality implemented by the API-implementing component. For example, one API of an API-implementing component can provide a first set of functions and can be exposed to third party developers, and another API of the API-implementing component can be hidden (not exposed) and provide a subset of the first set of functions and also provide another set of functions, such as testing or debugging functions which are not in the first set of functions. In other embodiments, the API-implementing component may itself call one or more other components via an underlying API and thus be both an API-calling component and an API-implementing component.

An API defines the language and parameters that API-calling components use when accessing and using specified features of the API-implementing component. For example, an API-calling component accesses the specified features of the API-implementing component through one or more API calls or invocations (embodied for example by function or method calls) exposed by the API and passes data and control information using parameters via the API calls or invocations. The API-implementing component may return a value through the API in response to an API call from an API-calling component. While the API defines the syntax and result of an API call (e.g., how to invoke the API call and what the API call does), the API may not reveal how the API call accomplishes the function specified by the API call. Various API calls are transferred via the one or more application programming interfaces between the calling (API-calling component) and an API-implementing component. Transferring the API calls may include issuing, initiating, invoking, calling, receiving, returning, or responding to the function calls or messages; in other words, transferring can describe actions by either of the API-calling component or the API-implementing component. The function calls or other invocations of the API may send or receive one or more parameters through a parameter list or other structure. A parameter can be a constant, key, data structure, object, object class, variable, data type, pointer, array, list or a pointer to a function or method or another way to reference a data or other item to be passed via the API.

Furthermore, data types or classes may be provided by the API and implemented by the API-implementing component. Thus, the API-calling component may declare variables, use pointers to, use or instantiate constant values of such types or classes by using definitions provided in the API.

Generally, an API can be used to access a service or data provided by the API-implementing component or to initiate performance of an operation or computation provided by the API-implementing component. By way of example, the API-implementing component and the API-calling component may each be any one of an operating system, a library, a device driver, an API, an application program, or other module (it should be understood that the API-implementing component and the API-calling component may be the same or different type of module from each other). API-implementing components may in some cases be embodied at least in part in firmware, microcode, or other hardware logic. In some embodiments, an API may allow a client program to use the services provided by a Software Development Kit (SDK) library. In other embodiments, an application or other client program may use an API provided by an Application Framework. In these embodiments, the application or client program may incorporate calls to functions or methods provided by the SDK and provided by the API or use data types or objects defined in the SDK and provided by the API. An Application Framework may in these embodiments provide a main event loop for a program that responds to various events defined by the Framework. The API allows the application to specify the events and the responses to the events using the Application Framework. In some implementations, an API call can report to an application the capabilities or state of a hardware device, including those related to aspects such as input capabilities and state, output capabilities and state, processing capability, power state, storage capacity and state, communications capability, etc., and the API may be implemented in part by firmware, microcode, or other low-level logic that executes in part on the hardware component.

The API-calling component may be a local component (i.e., on the same data processing system as the API-implementing component) or a remote component (i.e., on a different data processing system from the API-implementing component) that communicates with the API-implementing component through the API over a network. It should be understood that an API-implementing component may also act as an API-calling component (i.e., it may make API calls to an API exposed by a different API-implementing component) and an API-calling component may also act as an API-implementing component by implementing an API that is exposed to a different API-calling component.

The API may allow multiple API-calling components written in different programming languages to communicate with the API-implementing component (thus the API may include features for translating calls and returns between the API-implementing component and the API-calling component); however, the API may be implemented in terms of a specific programming language. An API-calling component can, in one embodiment, call APIs from different providers such as a set of APIs from an OS provider and another set of APIs from a plug-in provider and another set of APIs from another provider (e.g., the provider of a software library) or creator of another set of APIs.

Figure 11:
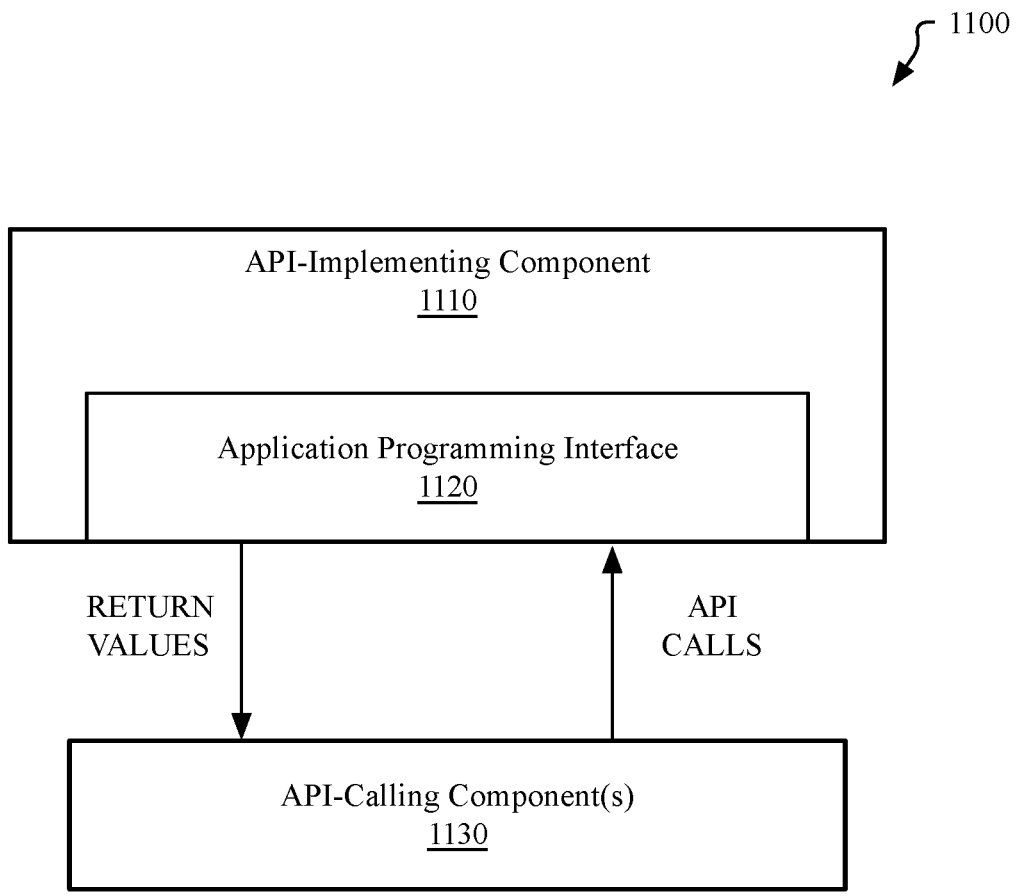
FIG. 11 is a block diagram illustrating an exemplary API architecture, which may be used in some embodiments of the invention.

FIG. 11 is a block diagram illustrating an exemplary API architecture, which may be used in some embodiments of the invention. As shown in FIG. 11, the API architecture 1100 includes the API-implementing component 1110 (e.g., an operating system, a library, a device driver, an API, an application program, software or other module) that implements the API 1120. The API 1120 specifies one or more functions, methods, classes, objects, protocols, data structures, formats and/or other features of the API-implementing component that may be used by the API-calling component 1130. The API 1120 can specify at least one calling convention that specifies how a function in the API-implementing component receives parameters from the API-calling component and how the function returns a result to the API-calling component. The API-calling component 1130 (e.g., an operating system, a library, a device driver, an API, an application program, software or other module), makes API calls through the API 1120 to access and use the features of the API-implementing component 1110 that are specified by the API 1120. The API-implementing component 1110 may return a value through the API 1120 to the API-calling component 1130 in response to an API call.

It will be appreciated that the API-implementing component 1110 may include additional functions, methods, classes, data structures, and/or other features that are not specified through the API 1120 and are not available to the API-calling component 1130. It should be understood that the API-calling component 1130 may be on the same system as the API-implementing component 1110 or may be located remotely and accesses the API-implementing component 1110 using the API 1120 over a network. While FIG. 11 illustrates a single API-calling component 1130 interacting with the API 1120, it should be understood that other API-calling components, which may be written in different languages (or the same language) than the API-calling component 1130, may use the API 1120.

The API-implementing component 1110, the API 1120, and the API-calling component 1130 may be stored in a machine-readable medium, which includes any mechanism for storing information in a form readable by a machine (e.g., a computer or other data processing system). For example, a machine-readable medium includes magnetic disks, optical disks, random-access memory; read only memory, flash memory devices, etc.

Figure 12:
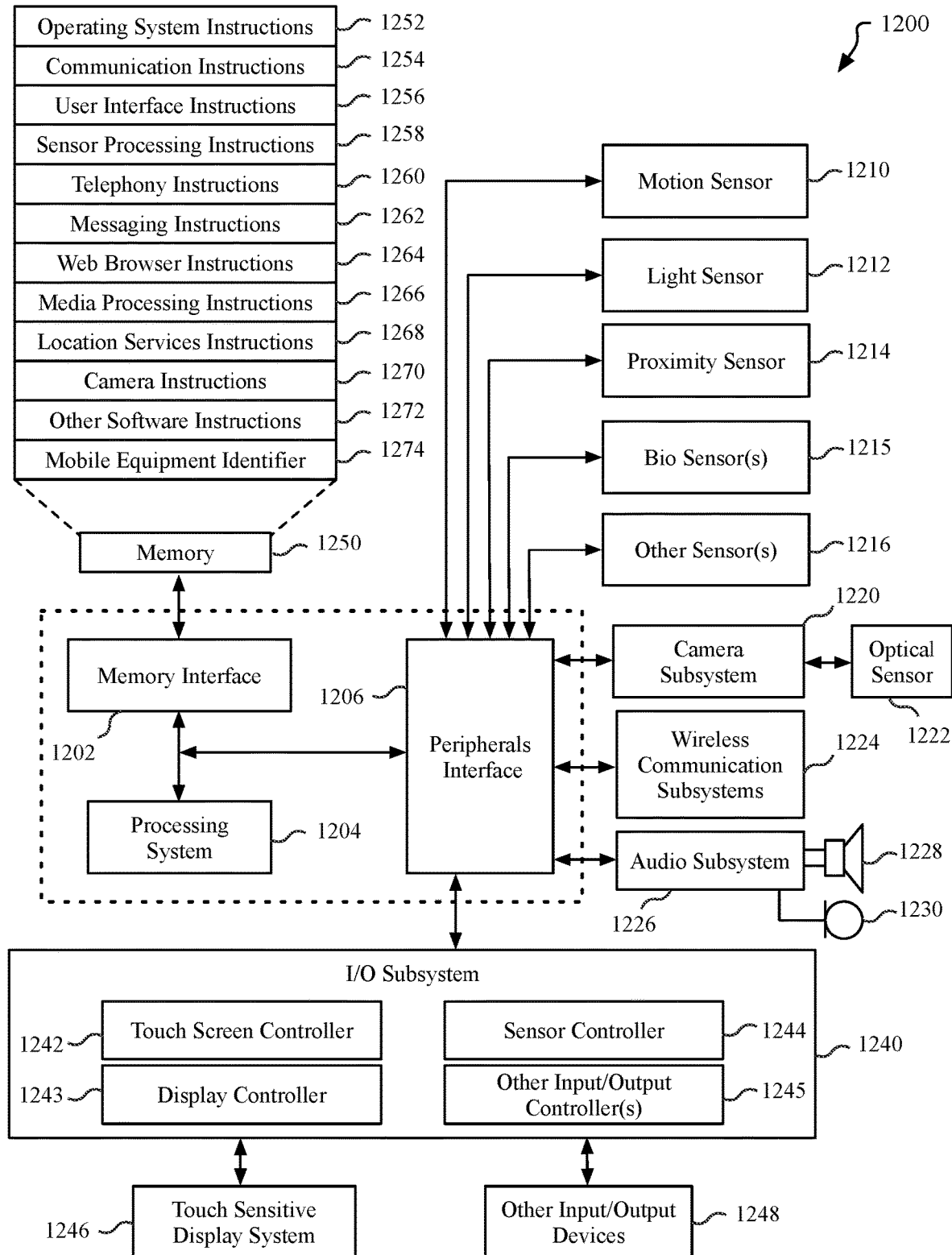
FIG. 12 is a block diagram of a device architecture for a mobile or embedded device, according to an embodiment.

FIG. 12 is a block diagram of a device architecture 1200 for a mobile or embedded device, according to an embodiment. The device architecture 1200 includes a memory interface 1202, a processing system 1204 including one or more data processors, image processors and/or graphics processing units, and a peripherals interface 1206. The various components can be coupled by one or more communication buses or signal lines. The various components can be separate logical components or devices or can be integrated in one or more integrated circuits, such as in a system on a chip integrated circuit.

The memory interface 1202 can be coupled to memory 1250, which can include high-speed random-access memory such as static random-access memory (SRAM) or dynamic random-access memory (DRAM) and/or non-volatile memory, such as but not limited to flash memory (e.g., NAND flash, NOR flash, etc.).

Sensors, devices, and subsystems can be coupled to the peripherals interface 1206 to facilitate multiple functionalities. For example, a motion sensor 1210, a light sensor 1212, and a proximity sensor 1214 can be coupled to the peripherals interface 1206 to facilitate the mobile device functionality. One or more biometric sensor(s) 1215 may also be present, such as a fingerprint scanner for fingerprint recognition or an image sensor for facial recognition. Other sensors 1216 can also be connected to the peripherals interface 1206, such as a positioning system (e.g., GPS receiver), a temperature sensor, or other sensing device, to facilitate related functionalities. A camera subsystem 1220 and an optical sensor 1222, e.g., a charged coupled device (CCD) or a complementary metal-oxide semiconductor (CMOS) optical sensor, can be utilized to facilitate camera functions, such as recording photographs and video clips.

Communication functions can be facilitated through one or more wireless communication subsystems 1224, which can include radio frequency receivers and transmitters and/or optical (e.g., infrared) receivers and transmitters. The specific design and implementation of the wireless communication subsystems 1224 can depend on the communication network(s) over which a mobile device is intended to operate. For example, a mobile device including the illustrated device architecture 1200 can include wireless communication subsystems 1224 designed to operate over a GSM network, a CDMA network, an LTE network, a Wi-Fi network, a Bluetooth network, or any other wireless network. In particular, the wireless communication subsystems 1224 can provide a communications mechanism over which a media playback application can retrieve resources from a remote media server or scheduled events from a remote calendar or event server.

An audio subsystem 1226 can be coupled to a speaker 1228 and a microphone 1230 to facilitate voice-enabled functions, such as voice recognition, voice replication, digital recording, and telephony functions. In smart media devices described herein, the audio subsystem 1226 can be a high-quality audio system including support for virtual surround sound.

The I/O subsystem 1240 can include a touch screen controller 1242 and/or other input controller(s) 1245. For computing devices including a display device, the touch screen controller 1242 can be coupled to a touch sensitive display system 1246 (e.g., touch-screen). The touch sensitive display system 1246 and touch screen controller 1242 can, for example, detect contact and movement and/or pressure using any of a plurality of touch and pressure sensing technologies, including but not limited to capacitive, resistive, infrared, and surface acoustic wave technologies, as well as other proximity sensor arrays or other elements for determining one or more points of contact with a touch sensitive display system 1246. Display output for the touch sensitive display system 1246 can be generated by a display controller 1243. In one embodiment, the display controller 1243 can provide frame data to the touch sensitive display system 1246 at a variable frame rate.

In one embodiment, a sensor controller 1244 is included to monitor, control, and/or processes data received from one or more of the motion sensor 1210, light sensor 1212, proximity sensor 1214, or other sensors 1216. The sensor controller 1244 can include logic to interpret sensor data to determine the occurrence of one of more motion events or activities by analysis of the sensor data from the sensors.

In one embodiment, the I/O subsystem 1240 includes other input controller(s) 1245 that can be coupled to other input/control devices 1248, such as one or more buttons, rocker switches, thumb-wheel, infrared port, USB port, and/or a pointer device such as a stylus, or control devices such as an up/down button for volume control of the speaker 1228 and/or the microphone 1230.

In one embodiment, the memory 1250 coupled to the memory interface 1202 can store instructions for an operating system 1252, including portable operating system interface (POSIX) compliant and non-compliant operating system or an embedded operating system. The operating system 1252 may include instructions for handling basic system services and for performing hardware dependent tasks. In some implementations, the operating system 1252 can be a kernel.

The memory 1250 can also store communication instructions 1254 to facilitate communicating with one or more additional devices, one or more computers and/or one or more servers, for example, to retrieve web resources from remote web servers. The memory 1250 can also include user interface instructions 1256, including graphical user interface instructions to facilitate graphic user interface processing.

Additionally, the memory 1250 can store sensor processing instructions 1258 to facilitate sensor-related processing and functions; telephony instructions 1260 to facilitate telephone-related processes and functions; messaging instructions 1262 to facilitate electronic-messaging related processes and functions; web browser instructions 1264 to facilitate web browsing-related processes and functions; media processing instructions 1266 to facilitate media processing-related processes and functions; location services instructions including GPS and/or navigation instructions 1268 and Wi-Fi based location instructions to facilitate location based functionality; camera instructions 1270 to facilitate camera-related processes and functions; and/or other software instructions 1272 to facilitate other processes and functions, e.g., security processes and functions, and processes and functions related to the systems. The memory 1250 may also store other software instructions such as web video instructions to facilitate web video-related processes and functions; and/or web shopping instructions to facilitate web shopping-related processes and functions. In some implementations, the media processing instructions 1266 are divided into audio processing instructions and video processing instructions to facilitate audio processing-related processes and functions and video processing-related processes and functions, respectively. A mobile equipment identifier, such as an International Mobile Equipment Identity (IMEI) 1274 or a similar hardware identifier can also be stored in memory 1250.

Each of the above identified instructions and applications can correspond to a set of instructions for performing one or more functions described above. These instructions need not be implemented as separate software programs, procedures, or modules. The memory 1250 can include additional instructions or fewer instructions. Furthermore, various functions may be implemented in hardware and/or in software, including in one or more signal processing and/or application specific integrated circuits.

Figure 13:
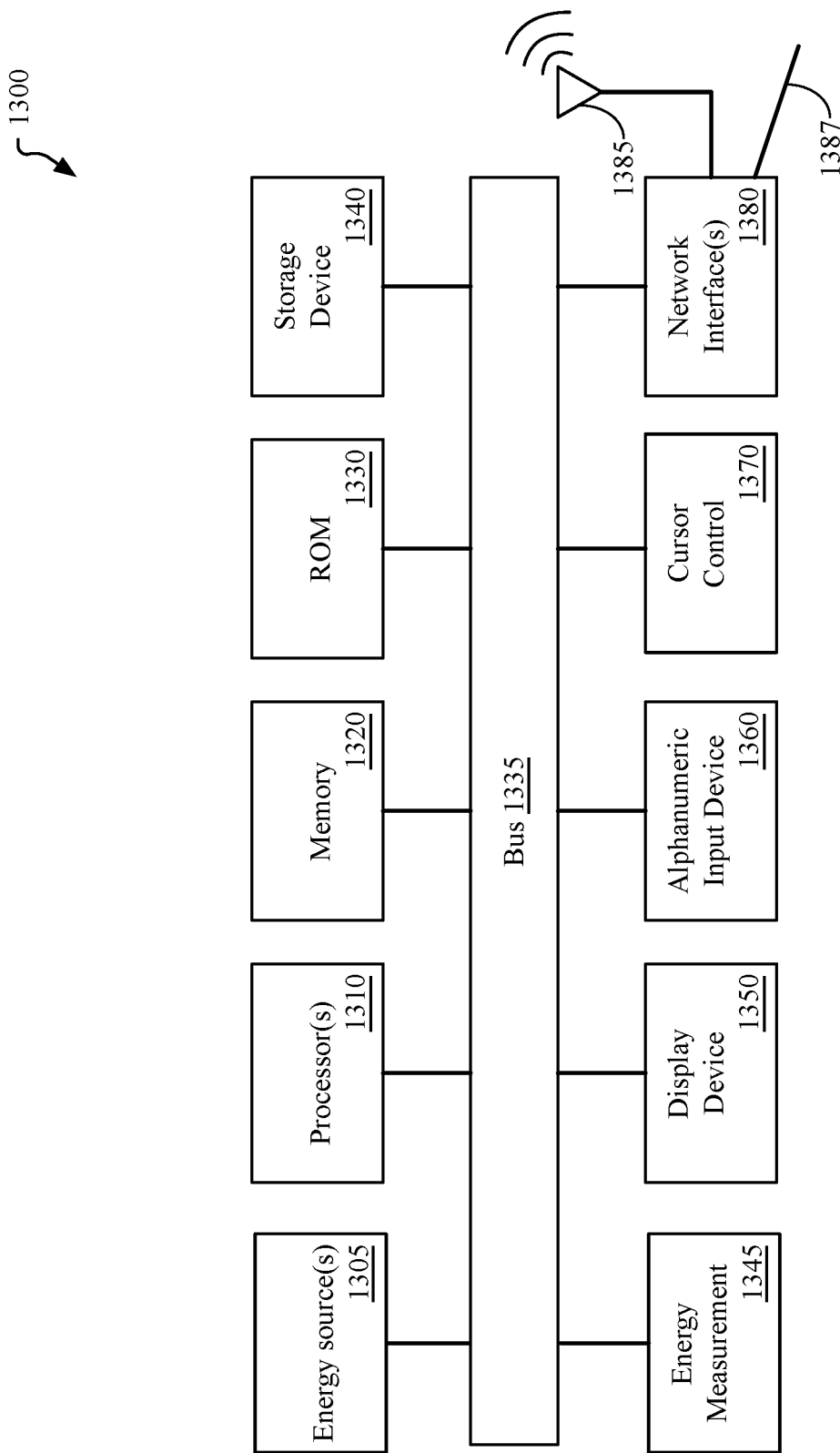
FIG. 13 is a block diagram of a computing system, according to an embodiment.

FIG. 13 is a block diagram of a computing system 1300, according to an embodiment. The illustrated computing system 1300 is intended to represent a range of computing systems (either wired or wireless) including, for example, desktop computer systems, laptop computer systems, tablet computer systems, cellular telephones, personal digital assistants (PDAs) including cellular-enabled PDAs, set top boxes, entertainment systems or other consumer electronic devices, smart appliance devices, or one or more implementations of a smart media playback device. Alternative computing systems may include more, fewer and/or different components. The computing system 1300 can be used to provide the computing device and/or a server device to which the computing device may connect.

The computing system 1300 includes bus 1335 or other communication device to communicate information, and processor(s) 1310 coupled to bus 1335 that may process information. While the computing system 1300 is illustrated with a single processor, the computing system 1300 may include multiple processors and/or co-processors. The computing system 1300 further may include memory 1320 in the form of random access memory (RAM) or other dynamic storage device coupled to the bus 1335. The memory 1320 may store information and instructions that may be executed by processor(s) 1310. The memory 1320 may also be main memory that is used to store temporary variables or other intermediate information during execution of instructions by the processor(s) 1310.

The computing system 1300 may also include read only memory (ROM) 1330 and/or another data storage device 1340 coupled to the bus 1335 that may store information and instructions for the processor(s) 1310. The data storage device 1340 can be or include a variety of storage devices, such as a flash memory device, a magnetic disk, or an optical disc and may be coupled to computing system 1300 via the bus 1335 or via a remote peripheral interface.

The computing system 1300 may also be coupled, via the bus 1335, to a display device 1350 to display information to a user. The computing system 1300 can also include an alphanumeric input device 1360, including alphanumeric and other keys, which may be coupled to bus 1335 to communicate information and command selections to processor(s) 1310. Another type of user input device includes a cursor control 1370 device, such as a touchpad, a mouse, a trackball, or cursor direction keys to communicate direction information and command selections to processor(s) 1310 and to control cursor movement on the display device 1350. The computing system 1300 may also receive user input from a remote device that is communicatively coupled via one or more network interface(s) 1380.

The computing system 1300 further may include one or more network interface(s) 1380 to provide access to a network, such as a local area network. The network interface(s) 1380 may include, for example, a wireless network interface having antenna 1385, which may represent one or more antenna(e). The computing system 1300 can include multiple wireless network interfaces such as a combination of Wi-Fi, Bluetooth®, near field communication (NFC), and/or cellular telephony interfaces. The network interface(s) 1380 may also include, for example, a wired network interface to communicate with remote devices via network cable 1387, which may be, for example, an Ethernet cable, a coaxial cable, a fiber optic cable, a serial cable, or a parallel cable.

In one embodiment, the network interface(s) 1380 may provide access to a local area network, for example, by conforming to IEEE 802.11 wireless standards and/or the wireless network interface may provide access to a personal area network, for example, by conforming to Bluetooth standards. Other wireless network interfaces and/or protocols can also be supported. In addition to, or instead of, communication via wireless LAN standards, network interface(s) 1380 may provide wireless communications using, for example, Time Division, Multiple Access (TDMA) protocols, Global System for Mobile Communications (GSM) protocols, Code Division, Multiple Access (CDMA) protocols, Long Term Evolution (LTE) protocols, and/or any other type of wireless communications protocol.

The computing system 1300 can further include one or more energy sources 1305 and one or more energy measurement systems 1345. Energy sources 1305 can include an AC/DC adapter coupled to an external power source, one or more batteries, one or more charge storage devices, a USB charger, or other energy source. Energy measurement systems include at least one voltage or amperage measuring device that can measure energy consumed by the computing system 1300 during a predetermined period of time. Additionally, one or more energy measurement systems can be included that measure, e.g., energy consumed by a display device, cooling subsystem, Wi-Fi subsystem, or other frequently used or high-energy consumption subsystem.

In some embodiments, the hash functions described herein can utilize specialized hardware circuitry (or firmware) of the system (client device or server). For example, the function can be a hardware-accelerated function. In addition, in some embodiments, the system can use a function that is part of a specialized instruction set. For example, the can use an instruction set which may be an extension to an instruction set architecture for a particular type of microprocessor. Accordingly, in an embodiment, the system can provide a hardware-accelerated mechanism for performing cryptographic operations to improve the speed of performing the functions described herein using these instruction sets.

Reference herein to "one embodiment" or "an embodiment" means that a particular feature, structure, or characteristic described in conjunction with the embodiment can be included in at least one embodiment of the invention. The appearances of the phrase "in one embodiment" in various places in the specification do not necessarily all refer to the same embodiment. The processes depicted in the figures that follow are performed by processing logic that comprises hardware (e.g. circuitry, dedicated logic, etc.), software (as instructions on a non-transitory machine-readable storage medium), or a combination of both hardware and software. Reference will be made in detail to various embodiments, examples of which are illustrated in the accompanying drawings. In the following detailed description, numerous specific details are set forth in order to provide a thorough understanding of the present invention. However, it will be apparent to one of ordinary skill in the art that the present invention may be practiced without these specific details. In other instances, well-known methods, procedures, components, circuits, and networks have not been described in detail so as not to unnecessarily obscure aspects of the embodiments.

It will also be understood that, although the terms first, second, etc. may be used herein to describe various elements, these elements should not be limited by these terms. These terms are only used to distinguish one element from another. For example, a first contact could be termed a second contact, and, similarly, a second contact could be termed a first contact, without departing from the scope of the present invention. The first contact and the second contact are both contacts, but they are not the same contact.

The terminology used herein is for the purpose of describing particular embodiments only and is not intended to be limiting as to all embodiments. As used in the description of the invention and the appended claims, the singular forms "a", "an" and "the" are intended to include the plural forms as well, unless the context clearly indicates otherwise. It will also be understood that the term "and/or" as used herein refers to and encompasses any and all possible combinations of one or more of the associated listed items. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

As used herein, the term "if" may be construed to mean "when" or "upon" or "in response to determining" or "in response to detecting," depending on the context. Similarly, the phrase "if it is determined" or "if [a stated condition or event] is detected" may be construed to mean "upon determining" or "in response to determining" or "upon detecting [the stated condition or event]" or "in response to detecting [the stated condition or event]," depending on the context.

Embodiments of computing devices, user interfaces for such devices, and associated processes for using such devices are described. In some embodiments, the computing device is a portable communications device such as a mobile telephone that also contains other functions, such as PDA and/or music player functions. Exemplary embodiments of portable multifunction devices include, without limitation, the iPhone®, iPad®, and iPod Touch® devices from Apple Computer, Inc. of Cupertino, Calif.

In the foregoing description, example embodiments of the disclosure have been described. It will be evident that various modifications can be made thereto without departing from the broader spirit and scope of the disclosure. The specification and drawings are, accordingly, to be regarded in an illustrative sense rather than a restrictive sense. The specifics in the descriptions and examples provided may be used anywhere in one or more embodiments. The various features of the different embodiments or examples may be variously combined with some features included and others excluded to suit a variety of different applications. Examples may include subject matter such as a method, means for performing acts of the method, at least one machine-readable medium including instructions that, when performed by a machine cause the machine to perform acts of the method, or of an apparatus or system according to embodiments and examples described herein. Additionally, various components described herein can be a means for performing the operations or functions described herein.

Embodiments described herein provide for system and methods to crowdsource the location of wireless devices and accessories that lack a connection to a wide area network.

One embodiment provides for a data processing system configured to perform operations comprising launching a user interface on an electronic device, the user interface to enable the determination of a location of a wireless accessory that is associated with the electronic device, generating a set of public keys included within a beacon signal broadcast by the wireless accessory, the beacon signal broadcast during a first period, sending the set of public keys to a server with a request to return data that corresponds with a public key in the set of public keys, decrypting the location data using a private key associated with the public key, processing the location data to determine a probable location for the wireless accessory, and displaying the probable location for the wireless accessory via the user interface.

One embodiment provides for a data processing system comprising a memory to store instructions for execution and one or more processors to execute the instructions stored in memory. The instructions, when executed, cause the one or more processors to launch a user interface on an electronic device that includes the data processing system, the user interface to enable the determination of a location of a wireless accessory that is associated with the electronic device, generate a set of public keys included within a beacon signal broadcast by the wireless accessory, the beacon signal broadcast during a first period, send the set of public keys to a server with a request to return data that corresponds with a public key in the set of public keys, decrypt the location data using a private key associated with the public key in response to receipt of location data from the server, process the location data to determine a probable location for the wireless accessory, and display the probable location for the wireless accessory via the user interface.

One embodiment provides for a method implemented on an electronic device, the method comprising performing a beacon scan using a baseband processor of the electronic device. The beacon scan can be performed while an application processor of the electronic device is in a low power state. The method additionally comprises receiving beacon data via a wireless radio coupled to the baseband processor, the beacon data to identify a wireless accessory. The beacon identifier can be a public key generated by the wireless accessory. The method additionally comprises storing a timestamp and beacon identifier to a beacon scan buffer, determining a location for the electronic device that corresponds with the timestamp when an application processor of the electronic device is in an active state, encrypting the location for the electronic device using the beacon identifier for the wireless accessory, and transmitting encrypted location data, the beacon identifier, and the timestamp to a server device, the server to store the encrypted location data for retrieval by an electronic device associated with the wireless accessory.

Those skilled in the art will appreciate from the foregoing description that the broad techniques of the embodiments can be implemented in a variety of forms. Therefore, while the embodiments have been described in connection with particular examples thereof, the true scope of the embodiments should not be so limited since other modifications will become apparent to the skilled practitioner upon a study of the drawings, specification, and following claims.

What is claimed is:

1. A method for a wireless accessory:
    exchanging, by the wireless accessory, a first public key and one or more additional shared secrets with an electronic device, wherein the one or more additional shared secrets includes an anti-tracking secret;
    generating, by the wireless accessory, a second public key using the anti-tracking secret after expiration of a period of time, wherein the electronic device is enabled to generate the second public key for a new period of time using the anti-tracking secret;
    determining, by the wireless accessory, device status information for the wireless accessory based at least in part on proximity of the electronic device with respect to the wireless accessory or a communication corresponding to the device status information received from the electronic device; and
    during the new period of time, broadcasting, by the wireless accessory, at least one beacon signal that includes the device status information and the second public key.

2. The method of claim 1, wherein generating the second public key includes generating the second public key based on the anti-tracking secret and the first public key.

3. The method of claim 1, wherein the device status information comprises at least one of a lost status that indicates that the wireless accessory has determined to be in a lost state or has been placed in the lost state, an alarm status indicating that the wireless accessory is in an alarm state and will trigger an alarm if moved from a current location, or a near-owner status indicating that the wireless accessory is in a near-owner state and has detected proximity of the electronic device.

4. The method of claim 3, wherein the device status information comprises the near-owner status indicating that the wireless accessory is in the near-owner state, the method further comprising decreasing, by the wireless accessory, a beacon rate when in the near-owner state.

5. The method of claim 4, wherein the wireless accessory enters the near-owner state after broadcasting the at least one beacon signal and receiving a reply from the electronic device associated with the wireless accessory.

6. The method of claim 3, wherein the device status information comprises the alarm status indicating that the wireless accessory is in the alarm state, the method further comprising increasing, by the wireless accessory, a beacon rate when in the alarm state.

7. The method of claim 1, further comprising after exchanging the anti-tracking secret, deleting, by the wireless accessory, the anti-tracking secret.

8. The method of claim 7, further comprising:
    generating, by the wireless accessory, a first data value based at least in part on the anti-tracking secret, wherein:
        generating the second public key includes generating the second public key based at least in part on the first data value; and
        deleting the anti-tracking secret includes deleting the anti-tracking secret after generating the first data value;
    generating, by the wireless accessory, a second data value based at least in part on the second data value; and
    deleting, by the wireless accessory, the second data value.

9. The method of claim 1, wherein the second public key comprises a new K-byte key that is generated every M minute.

10. The method of claim 1, wherein, in a lost state, the wireless accessory cannot be paired with another electronic device.

11. The method of claim 1, further comprising transmitting the least one beacon signal using ultra-wide band radio technology.

12. The method of claim 1, wherein generating the first public key comprises periodically generating a sequence of public keys based on the anti-tracking secret, and wherein broadcasting the at least one beacon signal comprises broadcasting a sequence of beacon signals each comprising at least one public key of the sequence of public keys.

13. A wireless accessory comprising:
a memory to store instructions for execution;
one or more processors to execute the instructions stored in the memory, wherein the instructions, when executed cause the one or more processors to:
exchange, by the wireless accessory, a first public key and one or more additional shared secrets with an electronic device, wherein the one or more additional shared secrets includes an anti-tracking secret;
generate, by the wireless accessory, a second public key using the anti-tracking secret after expiration of a period of time, wherein the electronic device is enabled to generate the second public key for a new period of time using the anti-tracking secret;
determine, by the wireless accessory, device status information for the wireless accessory based at least in part on proximity of the electronic device with respect to the wireless accessory or a communication corresponding to the device status information received from the electronic device; and
during the new period of time, broadcast, by the wireless accessory, at least one beacon signal that includes the device status information and the second public key.

14. The wireless accessory of claim 13, wherein generating the second public key includes generating the second public key based on the anti-tracking secret and the first public key.

15. The wireless accessory of claim 13, wherein the device status information comprises at least one of a lost status that indicates that the wireless accessory has determined to be in a lost state or has been placed in the lost state, an alarm status indicating that the wireless accessory is in an alarm state and will trigger an alarm if moved from a current location, or a near-owner status indicating that the wireless accessory is in a near-owner state and has detected proximity of the electronic device.

16. The wireless accessory of claim 15, wherein the device status information comprises the near-owner status indicating that the wireless accessory is in the near-owner state, wherein the instructions, when executed further cause the one or more processors to decrease, by the wireless accessory, a beacon rate when in the near-owner state.

17. The wireless accessory of claim 16, wherein the wireless accessory enters the near-owner state after broadcasting the at least one beacon signal and receiving a reply from the electronic device associated with the wireless accessory.

18. The wireless accessory of claim 15, wherein the device status information comprises the alarm status indicating that the wireless accessory is in the alarm state, wherein the instructions, when executed further cause the one or more processors to increase, by the wireless accessory, a beacon rate when in the alarm state.

19. The wireless accessory of claim 15, wherein the device status information comprises the near-owner status indicating that the wireless accessory is in the near-owner state, wherein the instructions, when executed further cause the one or more processors to decrease, by the wireless accessory, a rate at which new public keys are generated.

20. The wireless accessory of claim 13, further comprising after exchanging the anti-tracking secret, deleting, by the wireless accessory, the anti-tracking secret.

21. The wireless accessory of claim 13, wherein the second public key comprises a new K-byte key that is generated every M minute.

22. The wireless accessory of claim 13, wherein, in a lost state, the wireless accessory cannot be paired with another electronic device.

23. A non-transitory machine-readable medium storing instructions which, when executed, cause one or more processors of a data processing system to perform operations comprising:
exchange, by a wireless accessory, a public key and one or more additional shared secrets with an electronic device, wherein the one or more additional shared secrets includes an anti-tracking secret;
generate, by the wireless accessory, a second public key using the anti-tracking secret after expiration of a period of time, wherein the electronic device is enabled to generate the second public key for a new period of time using the anti-tracking secret;
determine, by the wireless accessory, device status information for the wireless accessory based at least in part on proximity of the electronic device with respect to the wireless accessory or a communication corresponding to the device status information received from the electronic device; and
during the new period of time, broadcast, by the wireless accessory, at least one beacon signal that includes the device status information and the second public key.

* * * * *